US011874063B2

(12) United States Patent
Bassi et al.

(10) Patent No.: US 11,874,063 B2
(45) Date of Patent: Jan. 16, 2024

(54) METAL SHEET WITH TAILORED PROPERTIES

(71) Applicant: Novelis Inc., Atlanta, GA (US)

(72) Inventors: Corrado Bassi, Salgesch (CH); Vinzenz Hofmann, Mollens (CH); Jörg Simon, Varone (CH)

(73) Assignee: Novelis Inc., Atlanta, GA (US)

( * ) Notice: Subject to any disclaimer, the term of this patent is extended or adjusted under 35 U.S.C. 154(b) by 0 days.

(21) Appl. No.: 17/806,287

(22) Filed: Jun. 10, 2022

(65) Prior Publication Data

US 2022/0299267 A1 Sep. 22, 2022

Related U.S. Application Data

(62) Division of application No. 15/783,275, filed on Oct. 13, 2017, now abandoned.

(Continued)

(51) Int. Cl.
*F27B 9/02* (2006.01)
*C21D 9/573* (2006.01)
(Continued)

(52) U.S. Cl.
CPC .............. *F27B 9/12* (2013.01); *C21D 9/0068* (2013.01); *C21D 9/573* (2013.01); *C22F 1/04* (2013.01);
(Continued)

(58) Field of Classification Search
None
See application file for complete search history.

(56) References Cited

U.S. PATENT DOCUMENTS 4,082,578 A 4/1978 Evancho et al.
5,435,162 A 7/1995 Caudill et al.
(Continued)

FOREIGN PATENT DOCUMENTS

CA 2372736 11/2000
CA 2286055 11/2003
(Continued)

OTHER PUBLICATIONS

"International Alloy Designations and Chemical Composition Limits for Wrought Aluminum and Wrought Aluminum Alloys", The Aluminum Association, Inc., Registration Record Series, Teal Sheets, Feb. 1, 2009, 35 pages.

(Continued)

*Primary Examiner* — Scott R Kastler
(74) *Attorney, Agent, or Firm* — Kilpatrick Townsend & Stockton LLP

(57) ABSTRACT

Moving metal strips can be heat treated with any number or combination of dimensionally variable tempers across widths, lengths, or thicknesses of a metal strip. To provide dimensionally variable heat treatment, an apparatus can include one or more heating units suitable to increase the temperature of a metal strip moving proximate the apparatus to a heat treatment temperature. The apparatus can also include one or more cooling units positioned near the heating units to absorb heat and cool the metal strip to minimize the amount of heat transferred from a first region of the metal strip that is to be treated to a second region of the metal strip that is not to be treated.

10 Claims, 22 Drawing Sheets

Related U.S. Application Data

(60) Provisional application No. 62/408,853, filed on Oct. 17, 2016.

(51) Int. Cl.

| | |
|---|---|
| ***C21D 9/00*** | (2006.01) |
| ***C22F 1/04*** | (2006.01) |
| ***F27B 9/30*** | (2006.01) |
| ***F27B 9/36*** | (2006.01) |
| ***F27B 9/40*** | (2006.01) |
| ***F27D 9/00*** | (2006.01) |
| ***F27B 9/12*** | (2006.01) |

(52) U.S. Cl.

CPC .................. *F27B 9/30* (2013.01); *F27B 9/36* (2013.01); *F27B 9/40* (2013.01); *F27D 9/00* (2013.01); *C21D 2221/00* (2013.01); *F27B 2009/124* (2013.01); *F27D 2009/007* (2013.01)

(56) References Cited

U.S. PATENT DOCUMENTS

| | | | |
|---|---|---|---|
| 5,700,424 | A | 12/1997 | Matsuo et al. |
| 5,948,185 | A | 9/1999 | Krajewski et al. |
| 6,224,992 | B1 | 5/2001 | Delbeke et al. |
| 6,280,543 | B1 | 8/2001 | Zonker et al. |
| 6,284,014 | B1 | 9/2001 | Carden |
| 6,406,571 | B1 | 6/2002 | Gupta et al. |
| 6,423,164 | B1 | 7/2002 | Bryant et al. |
| 6,424,077 | B1 | 7/2002 | Hata et al. |
| 8,211,251 | B2 | 7/2012 | Carsley et al. |
| 8,663,405 | B2 | 3/2014 | Krajewski |
| 9,453,273 | B2 | 9/2016 | Matsumoto et al. |
| 2002/0174920 | A1 | 11/2002 | Gupta et al. |
| 2004/0060917 | A1 | 4/2004 | Liu et al. |
| 2006/0016523 | A1 | 1/2006 | Dif et al. |
| 2008/0041501 | A1 | 2/2008 | Platek et al. |
| 2009/0090437 | A1 | 4/2009 | Ten Cate et al. |
| 2009/0148721 | A1 | 6/2009 | Hibino et al. |
| 2010/0012236 | A1 | 1/2010 | Hong et al. |
| 2010/0024924 | A1 | 2/2010 | Krajewski et al. |
| 2010/0084892 | A1 | 4/2010 | Yoshida et al. |
| 2012/0186706 | A1 | 7/2012 | Krajewski |
| 2013/0068351 | A1 | 3/2013 | Kamat et al. |
| 2013/0269843 | A1 | 10/2013 | Wust et al. |
| 2014/0069557 | A1 | 3/2014 | Smeyers, Sr. et al. |
| 2015/0007909 | A1 | 1/2015 | Matsumoto et al. |
| 2015/0125713 | A1 | 5/2015 | Harrison et al. |
| 2015/0191811 | A1 | 7/2015 | Miller-Jupp |
| 2015/0282253 | A1 | 10/2015 | Lackmann et al. |
| 2015/0334781 | A1 | 11/2015 | Verhagen et al. |
| 2016/0024607 | A1 | 1/2016 | Work et al. |
| 2016/0194728 | A1 | 7/2016 | Slattery |
| 2016/0326619 | A1 | 11/2016 | Bassi et al. |
| 2017/0247774 | A1 | 8/2017 | Sachdev et al. |
| 2018/0066891 | A1 | 3/2018 | Todorov |
| 2018/0106546 | A1* | 4/2018 | Bassi ........................ F27B 9/36 |

FOREIGN PATENT DOCUMENTS

| | | |
|---|---|---|
| CN | 1304603 | 3/2007 |
| CN | 100404701 | 7/2008 |
| CN | 104114726 | 10/2014 |
| CN | 105026582 | 11/2015 |
| DE | 69800931 | 1/2002 |
| DE | 69923742 | 1/2006 |
| EP | 931170 | 7/1999 |
| EP | 1190109 | 11/2003 |
| EP | 1392877 | 8/2011 |
| EP | 3190860 | 7/2017 |
| GB | 1493491 | 11/1977 |
| GB | 2504005 | 1/2014 |
| JP | 58224162 | 12/1983 |
| JP | 60244418 | 12/1985 |
| JP | 61246315 | 11/1986 |
| JP | 05279822 | 10/1993 |
| JP | 6287725 | 10/1994 |
| JP | 2002544392 | 12/2002 |
| JP | 2003328095 | 11/2003 |
| JP | 2010044875 | 2/2010 |
| JP | 2011017063 | 1/2011 |
| JP | 2013111591 | 6/2013 |
| JP | 2013167004 | 8/2013 |
| JP | 2014148726 | 8/2014 |
| JP | 2015101756 | 6/2015 |
| JP | 2016500751 | 1/2016 |
| KR | 100964855 | 6/2010 |
| KR | 20140114031 | 9/2014 |
| KR | 20150056654 | 5/2015 |
| RU | 2326182 | 6/2008 |
| RU | 2341585 | 12/2008 |
| WO | 0070115 | 11/2000 |
| WO | 2009132436 | 11/2009 |
| WO | 2014118724 | 8/2014 |
| WO | 2016035893 | 3/2016 |

OTHER PUBLICATIONS

U.S. Appl. No. 15/783,275 , "Advisory Action", dated Aug. 12, 2020, 4 pages.

U.S. Appl. No. 15/783,275 , "Advisory Action", dated Jul. 2, 2021, 5 pages.

U.S. Appl. No. 15/783,275 , "Final Office Action", dated Apr. 30, 2021, 17 pages.

U.S. Appl. No. 15/783,275 , "Final Office Action", dated Jun. 17, 2020, 23 pages.

U.S. Appl. No. 15/783,275 , "Non-Final Office Action", dated Jan. 28, 2020, 15 pages.

U.S. Appl. No. 15/783,275, "Non-Final Office Action", dated Nov. 12, 2021, 20 pages.

U.S. Appl. No. 15/783,275 , "Non-Final Office Action", dated Nov. 27, 2020, 20 pages.

Chinese Application No. 201780063859.9, "Office Action", dated May 7, 2020, 18 pages.

European Application No. 17797206.4 , "Notice of Decision to Grant", dated Aug. 5, 2021, 2 pages.

European Application No. 17797206.4 , "Office Action", dated Feb. 18, 2020, 4 pages.

European Application No. 17797206.4 , "Office Action", dated Jun. 30, 2020, 4 pages.

Esmaeili et al., "On the Precipitation-Hardening Behavior of the Al—Mg—Si—Cu Alloy AA6111", Metallurgical and Materials Transactions A, vol. 34A, Issue 3, Mar. 2003, pp. 751-763.

Hofmann , "Deep Drawing of Process Optimized Blanks", Journal of Materials Processing Technology, vol. 119, Issue 1-3, Dec. 20, 2001, pp. 127-132.

Indian Application No. 201917015398 , "First Examination Report", dated Jul. 20, 2021, 6 pages.

Japanese Application No. 2019-520126 , "Notice of Decision to Grant", dated Jan. 26, 2021, 3 pages.

Japanese Application No. JP2019-520126 , "Office Action", dated Oct. 13, 2020, 16 pages.

Japanese Application No. JP2019-520126 , "Office Action", dated Mar. 31, 2020, 8 pages.

Korean Application No. 10-2019-7014036 , "Notice of Decision to Grant", dated Feb. 23, 2021, 2 pages.

Korean Application No. 10-2019-7014036 , "Office Action", dated Aug. 27, 2020, 6 pages.

Liu et al., "Aluminum Alloy Material Application and Development", Metallurgical Industry Press, 2011, 8 pages.

Merklein et al., "A Review on Tailored Blanks—Production, Applications and Evaluation", Journal of Materials Processing Technology, vol. 214, Issue 2, Feb. 2014, pp. 151-164.

International Application No. PCT/US2017/056539 , "International Preliminary Report on Patentability", dated May 2, 2019, 7 pages.

International Application No. PCT/US2017/056539 , "International Search Report and Written Opinion", dated Dec. 20, 2017, 10 pages.

(56) References Cited

OTHER PUBLICATIONS

Vogt et al., "Design Principles of Tailored Heat Treated Blanks for the Manufacturing of Complex Car Body Parts", Proceedings of the IDDRG 2008 International Conference, International Deep Drawing Research Group, Jun. 16-18, 2008, pp. 557-568.
Vollertsen et al., "Enhancement of Drawability by Local Heat Treatment", Annals of the CIRP, vol. 47, Issue 1, 1998, pp. 181-184.
Vollertsen et al., "Modelling the Deep Drawing of Process Optimized Blanks", International Deep Drawing Research Group, 1998, pp. 67-76.

* cited by examiner

METAL SHEET WITH TAILORED PROPERTIES

CROSS REFERENCE TO RELATED APPLICATIONS

The present application is a continuation of U.S. patent application Ser. No. 15/783,275, filed Oct. 13, 2017, now abandoned, which claims the benefit of U.S. Provisional Patent Application No. 62/408,853 entitled "METAL SHEET WITH TAILORED PROPERTIES" filed Oct. 17, 2016, which hereby incorporated by reference in their entireties.

TECHNICAL FIELD

The present disclosure relates to metalworking generally and more specifically to heat treating metal strips.

BACKGROUND

Metal components can be used for many purposes, such as structural supports for vehicles like automobiles. Metal components can be formed from metal strips, such as by cutting the metal strips into individual blanks and deforming the individual blanks into the desired component shape (e.g., via drawing).

Certain components may require high strength, such as when used as a structural support. However, to correctly form a component, sometimes the metal must have sufficient elasticity or other desirable properties. Metals, such as aluminum alloys, can be heat treated to adjust their properties, such as strength and elasticity. Tempering is a heat treatment processes that can be used to adjust a metal's strength and elasticity, which often involves placing a formed metal component into a heat treat oven at an elevated temperature for a period of time.

Some examples of heat treatments can include:

- T1 heat treatment, which can involve cooling metal from an elevated temperature shaping process and naturally aging the metal to a substantially stable condition;
- T2 heat treatment, which can involve cooling metal from an elevated temperature shaping process, cold working, and naturally aging the metal to a substantially stable condition;
- T3 heat treatment, which can involve solution heat treating, cold working, and naturally aging the metal to a substantially stable condition;
- T4 heat treatment, which can involve solution heat treating and naturally aging the metal to a substantially stable condition;
- T5 heat treatment, which can involve cooling the metal from an elevated temperature shaping process before artificially aging the metal;
- T6 heat treatment, which can involve solution heat treating the metal and then artificially aging the metal;
- T7 heat treatment, which can involve solution heat treating then overaging or stabilizing the metal;
- T8 heat treatment, which can involve solution heat treating, cold working, then artificially aging the metal;
- T9 heat treatment, which can involve solution heat treating, artificially aging, then cold working the metal; and
- T10 heat treatment, which can involve cooling the metal from an elevated temperature shaping process, cold working, then artificially aging the metal.

Heat treatments that improve some properties can often negatively influence other properties. For example, treatments to improve a metal's strength may reduce that metal's ductility. Likewise, treatments to improve a metal's ductility may reduce that metal's strength. Therefore, when designing and manufacturing metal components, including when preparing the metal strip used to make the metal components, concessions are often made in some material properties so that minimum requirements of other material properties are met. Additionally, heat treatment of formed components can require substantial time and equipment.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Certain embodiments of the present disclosure include a metal processing system, comprising a dimensionally variable heat treatment apparatus having an opening for accepting a metal strip moving at a strip rate in a movement direction (e.g., processing direction), the heat treatment apparatus including: a heating unit positionable proximate the metal strip on a first side of a separation plane intersecting the metal strip to raise a strip temperature of a first portion of the metal strip on the first side of the separation plane at or above a heat treatment temperature; and a cooling unit positionable proximate the metal strip on a second side of the separation plane to maintain a second portion of the metal strip on the second side of the separation plane below the heat treatment temperature.

In some cases, the separation plane is parallel the metal strip, the heating unit extends across a width of the metal strip proximate the first side of the separation plane, and the cooling unit extends across the width of the metal strip proximate the second side of the separation plane. In some cases, the separation plane is parallel a longitudinal axis of the metal strip and perpendicular a top surface of the metal strip, and the heat treatment apparatus further includes an additional heating unit positionable proximate the metal strip on the first side of the separation plane and opposite the metal strip from the heating unit, and an additional cooling unit positionable proximate the metal strip on the second side of the separation plane and opposite the metal strip from the cooling unit. In some cases, the heating unit has sufficient heat generation power and has a sufficient length to maintain the strip temperature of the metal strip at or above the heat treatment temperature moving at the strip rate for a sufficient duration for tempering the metal strip. In some cases, the system further comprises a linear actuator coupled to the dimensionally variable heat treatment apparatus to laterally adjust the heating unit and cooling unit with respect to the metal strip to move the separation plane with respect to the metal strip. In some cases, the system further comprises a controller coupled to the linear actuator to laterally adjust the heating unit and the cooling unit as a function of longitudinal distance along the metal strip. In some cases, the system further comprises an additional dimensionally variable heat treatment apparatus having an additional heating unit and an additional cooling unit positioned proximate the metal strip on opposite sides of an additional separation plane, the additional dimensionally variable heat treatment apparatus is spaced apart from the dimensionally variable heat treatment apparatus, and the additional separation plane is not coplanar with the separation plane. In some cases, the separation plane is not parallel a lateral cross section of the metal strip.

Some embodiments of the present disclosure include a method for variably heat treating a metal strip across a dimension of the metal strip comprising passing a moving metal strip through a dimensionally variable heat treatment apparatus having a heating unit and a cooling unit positioned on opposite sides of a separation plane; heating a first portion of the moving metal strip by the heating unit, wherein heating the first portion includes raising a strip temperature of the first portion of the moving metal strip at or above a heat treatment temperature for a duration; and cooling the moving metal strip by the cooling unit, wherein cooling the moving metal strip includes removing heat from the moving metal strip adjacent the first portion sufficiently to maintain a temperature of a second portion of the moving metal strip below the heat treatment temperature, wherein the second portion of the metal strip is located opposite the separation plane from the first portion. Some cases disclose a metal product having dimensionally variable heat treatment prepared by this method.

In some cases, the method includes cooling the first portion of the moving metal strip after heating the first portion of the moving metal strip for the duration. In some cases, the method laterally adjusting the dimensionally variable heat treatment apparatus to move the separation plane with respect to the moving metal strip. In some cases, the method includes determining a longitudinal position of the dimensionally variable heat treatment apparatus along the moving metal strip, wherein laterally adjusting the dimensionally variable heat treatment apparatus includes using the longitudinal position to move the separation plane with respect to the moving metal strip as a function of the longitudinal position. In some cases, the separation plane is parallel the moving metal strip, heating the first portion of the moving metal strip includes heating one of a top and a bottom of the moving metal strip, and cooling the moving metal strip includes removing heat from another of the top and the bottom of the moving metal strip. In some cases, the separation plane is parallel a longitudinal axis of the moving metal strip and perpendicular atop surface of the moving metal strip, the dimensionally variable heat treatment apparatus further includes an additional heating unit and an additional cooling unit each positioned on opposite sides of the separation plane and both positioned opposite the moving metal strip from the heating unit and the cooling unit, heating the first portion of the moving metal strip includes heating the top surface and a bottom surface of the moving metal strip proximate the first portion, and cooling the moving metal strip includes cooling the top surface and the bottom surface of the moving metal strip proximate the second portion.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
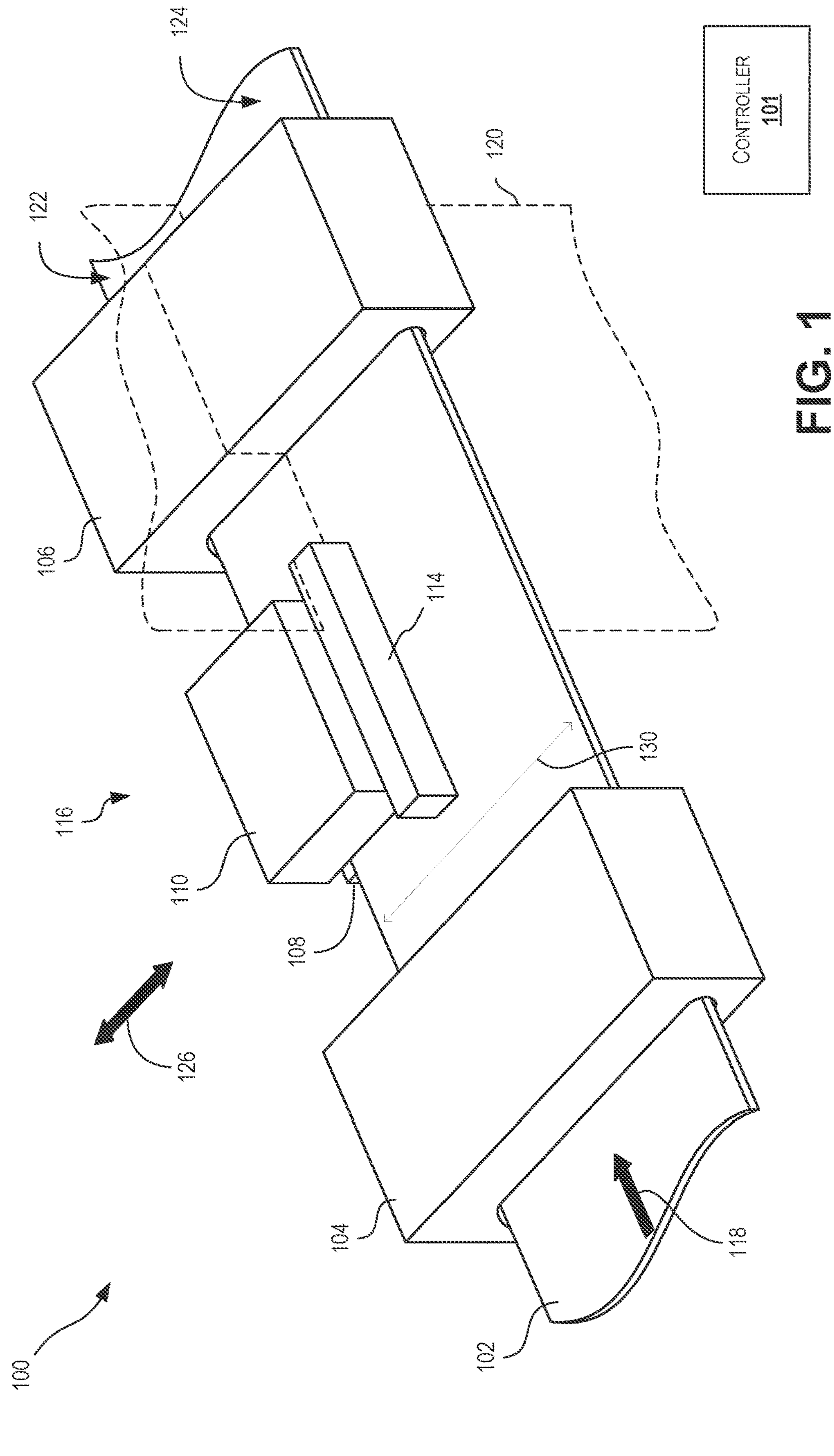
FIG. 1 is an axonometric diagram of a metal processing system for providing width-variable heat treatment to a metal strip.

Certain aspects and features of the present disclosure relate to heat treating moving metal strips with dimensional variability to induce dimensionally variable tempers. Treating a metal strip with dimensional variability can include providing different heat treatment to different regions of the metal strip across a dimension (e.g., width, length, or thickness) of the metal strip. The resultant metal strip can thus include multiple regions across a dimension, each region having different properties (e.g., mechanical properties, such as strength and elasticity). A dimensionally variable heat treatment apparatus can be used to heat treat a moving metal strip with dimensional variability. The apparatus can include one or more heating units suitable to maintain the temperature of a metal strip moving proximate the apparatus at a heat treatment temperature. The apparatus can also include one or more cooling units positioned near the heating units to absorb heat and cool the metal strip to minimize the amount of heat transferred from a first region of the metal strip (e.g., a heat treatment receiving region) to a second region of the metal strip (e.g., a region that is not to be heat treated, at least during this step). Dimensionally variable heat treatment can be used to produce metal strips having properties that are tailored to specific uses.

Certain aspects and features of the present disclosure may be applicable to use with moving metal articles other than metal strips in addition to metal strips. Examples of other moving metal articles can include moving metal plates, shates, or metal articles of other thicknesses. Therefore, any reference to a metal sheet with respect to certain aspects of the present disclosure may be substituted by reference to a metal plate, metal shate, or other metal article, as appropriate. As used herein, a plate generally has a thickness in a range of 5 mm to 50 mm. For example, a plate may refer to an aluminum product having a thickness of about 5 mm, 10 mm, 15 mm, 20 mm, 25 mm, 30 mm, 35 mm, 40 mm, 45 mm, or 50 mm. As used herein, a shate (also referred to as a sheet plate) generally has a thickness of from about 4 mm to about 15 mm. For example, a shate may have a thickness of 4 mm, 5 mm, 6 mm, 7 mm, 8 mm, 9 mm, 10 mm, 11 mm, 12 mm, 13 mm, 14 mm, or 15 mm. As used herein, a sheet generally refers to an aluminum product having a thickness of less than about 4 mm. For example, a sheet may have a thickness of less than 4 mm, less than 3 mm, less than 2 mm, less than 1 mm, less than 0.5 mm, less than 0.3 mm, or less than 0.1 mm.

Reference is made in this application to alloy temper or condition. For an understanding of the alloy temper descriptions most commonly used, see "American National Standards (ANSI) H35 on Alloy and Temper Designation Systems." An F condition or temper refers to an aluminum alloy as fabricated. An O condition or temper refers to an aluminum alloy after annealing. A T4 condition or temper refers to an aluminum alloy after solution heat treatment (i.e., solutionization) followed by natural aging. A T6 condition or temper refers to an aluminum alloy after solution heat treatment followed by artificial aging. A T7 condition or temper refers to an aluminum alloy after solution heat treatment and then followed by overaging or stabilizing. A T8 condition or temper refers to an aluminum alloy after solution heat treatment, followed by cold working and then by artificial aging. A T9 condition or temper refers to an aluminum alloy after solution heat treatment, followed by artificial aging, and then by cold working. An H1 condition or temper refers to an aluminum alloy after strain hardening. An H2 condition or temper refers to an aluminum alloy after strain hardening followed by partial annealing. An H3 condition or temper refers to an aluminum alloy after strain hardening and stabilization. A second digit following the HX condition or temper (e.g. H1X) indicates the final degree of strain hardening.

It can be desirable to produce a metal component that has different properties in different regions of the component. For example, an automotive structural support, such as a B pillar, may require high strength in some regions, such as where substantial loads may be concentrated during a crash or when a vehicle rolls, yet high formability (e.g., ductility) in other regions (e.g., to avoid cracking), such as near the bottom where the metal undergoes substantial forming to achieve the correct contoured shape. In another example, an automotive exterior panel, such as a door panel, can be provided with high strength on an exterior surface and high ductility on an interior surface. The high strength on the exterior surface can prevent damage, such as from pitting, wear, dents, and impacts, while the high ductility on the interior surface can aid in overall formability of the component.

When producing a metal component from metal stock (e.g., coiled metal strip or metal blanks), it can be desirable to use metal that has already been heat treated so that additional heat treating is not necessary, thus reducing the amount of labor, equipment, monetary cost, and time cost necessary to create the metal component. The concepts described herein can be used on a processing line built specifically to heat treat with dimensional variability, or can be incorporated into existing processing lines, such as Continuous Annealing Solution Heat treat (CASH) lines, blanking lines, or slitting lines. In some cases, the metal strip can be heat treated with dimensional variability immediately prior to coiling the metal strip. Heat treating the metal as it moves through a processing line can be more efficient in time usage, expense, and equipment usage over heat treating a component after forming, which is sometimes referred to as post-forming heat treatment (PFHT). For example, heat treating a metal strip passing through a blanking line allows heat treatment to be performed without the need for additional handling and heating of the formed components required by PFHT. Additionally, the use of tailored metal strips can reduce the need to rely on heat treatment during a paint baking process. During some paint baking processes, such as for automotives, metal floor panels may not reach temperatures sufficient to give significant hardening, at least because of a heat shielding effect from skin closure panels. Pre-forming heat treatment can thus provide enhanced hardening to floor panels which may otherwise not receive optimal hardening. While described herein with reference to applying heat treatment to moving metal strips, in some cases, a dimensionally variable heat treatment apparatus can be used with non-moving metal blanks.

As used herein, the term "separation plane" can refer to an imaginary plane that separates a metal strip into a region that is treated by the dimensionally variable heat treatment apparatus and a region that is not treated by the dimensionally variable heat treatment apparatus. In some cases, when applicable, the separation plane can refer to the imaginary plane that separates the heating unit(s) from the cooling unit(s) of a dimensionally variable heat treatment apparatus, such as those described herein. In an example, a metal strip produced using the aspects and features of the present disclosure can have a T4 temper on one side of the separation plane and a T61 temper on the other side of the separation plane. In some cases, multiple separation planes can be used, thus providing three or more regions. When three or more regions are used, each region can have a different temper or multiple non-adjacent regions can share the same temper. For example, in a three-temper, dimensionally variable heat treated metal strip, a first region can be T4, a second region can be T61, and a third region can be T4. As another example, in a three-temper, dimensionally variable heat treated metal strip, a first region can be T4, a second region can be T61 with a strength of approximately 160 mega Pascals (Mpa), and a third region can be T61 with a strength of approximately 190 Mpa. Regions with T61 temper can be tempered to various percentages of T6 tempering (e.g., 20%, 30%, 40%, 50%, 60%, 70%, or 80% of T6).

In an example, a thickness-variable heat treatment apparatus can induce a thermal gradient across the thickness of a metal strip. For example, when aluminum alloys are used, the heating unit can maintain a temperature of approximately 250° C. to 300° C. at the heat treatment-receiving side of the metal strip while the cooling unit maintains a temperature of approximately 100° C. to 180° C. at the non-heat treatment-receiving side of the metal strip. Other temperatures can be used. By applying a suitable temperature gradient for a sufficient amount of time (e.g., as defined by the speed of the metal strip and the longitudinal length of the heating unit in the rolling or movement direction), various properties of the metal strip can be specifically tailored. For example, thickness-variable heat treatment can produce a metal strip with a top side that is harder than a bottom side.

Separation planes can be in any suitable orientation. When parallel with a top or bottom surface of the metal strip, a separation plane can intersect the thickness of the metal strip to result in heat treatment that varies across the thickness of the metal strip (i.e., thickness-variable heat treatment). When perpendicular to a top or bottom surface of the metal strip and a lateral axis of the metal strip, a separation plane can intersect the metal strip to result in a heat treatment that varies across the width (e.g., a lateral axis) of the metal strip (i.e., width-variable heat treatment). When perpendicular to a top or bottom surface of the metal strip and parallel a lateral axis of the metal strip, a separation plane can intersect the metal strip to result in a heat treatment that varies across the length (e.g., a longitudinal axis) of the metal strip (i.e., a length-variable heat treatment). Separation planes can also be located in other directions and multiple types of separation planes can be used on a single metal strip. A metal strip with dimensionally variable heat treatments can be created by having a separation plane that is not parallel a lateral cross section of the metal strip (e.g., a separation plane that is not perpendicular to both the top surface of the metal strip and the longitudinal axis of the metal strip).

Generally, a dimensionally variable heat treatment apparatus can include at least one heating unit and at least one cooling unit, positioned on opposite sides of a separation plane. For example, in a thickness-variable heat treatment apparatus, a heating unit spanning the full width of a metal strip can be located near the top surface of the metal strip and a cooling unit spanning the full width of the metal strip can be located near the bottom surface of the metal strip, opposite the heating unit. In another non-limiting example, in a width-variable heat treatment apparatus, two heating units can be located near the top and bottom surfaces of the metal strip opposite from one another, but extending for less than the full width of the metal strip, and two cooling units can be located near the top and bottom surfaces of the metal strip opposite from one another and laterally adjacent to the heating units. The separation plane for such an example can be approximately near the boundary between the heating units and cooling units.

In some cases, a dimensionally variable heat treatment apparatus can include one or more heating units and no cooling units, wherein the one or more heating units are arranged to apply different heat treatment on opposite sides of a separation plane. For example, a first heating unit on a first side of a separation plane can heat the portion of the metal strip proximate thereto to a temperature that is different from a temperature that a second heating unit on a second side of the separation plane heats the portion of the metal strip proximate the second heating unit.

A dimensionally variable heat treatment apparatus can include one or multiple heating units. Various types of heating units can be used, such as induction heating devices, resistive heating devices, thermoelectric devices, gas-powered heating devices (e.g., direct flame), convection heating devices (e.g., circulating hot fluid, such as air), laser heating devices, or others. In some cases, a heating unit can provide multiple, individually controllable zones of heating. In some cases, an induction heating unit can induce current in the moving metal strip to generate heat in the moving metal strip. The use of an induction heating unit can minimize or eliminate direct contact between the heating unit and the moving metal strip. Also, an induction heating unit can be tuned to generate current at or near the surface of the metal strip. In some cases, the heating unit can be located proximate the metal strip as the metal strip moves horizontally, vertically, or diagonally between rollers or other supports. In some cases, a heating unit can be incorporated into one or more rollers. The heating unit can output sufficient heat and be of sufficient length to maintain the temperature of the metal strip adjacent the heating units at a desired heat treatment temperature (e.g., 190° C.) for a desired length of time (e.g., 1-2 minutes). In some cases, a heat treatment temperature can be known as a tempering temperature. In some cases, a heat treatment temperature can be an annealing temperature, a solutionizing temperature, or any other suitable temperature for performing desired heat treatment. In some cases, a solutionizing temperature for a particular metal alloy can be a temperature that is approximately 20° C.-40° C., 25° C.-35° C., or 30° C. less than a solidus temperature of that particular metal alloy. As used herein, heating a metal article to a desired temperature can include heating the metal article until the peak metal temperature of the metal article reaches the desired temperature. As used herein, heating a metal article at a desired temperature for a desired duration can include maintaining the peak metal temperature of the metal article at the desired temperature for the desired duration (e.g., the desired duration can begin once the peak metal temperature reaches the desired temperature).

The length of one or a group of heating units can be determined based on the desired amount of time the metal strip should be kept at a heat treatment temperature and the speed of movement of the metal strip. In some cases, the heating unit(s) may need to occupy a significant length, such as approximately 40 meters. In some cases, the metal strip can snake back and forth through multiple heating units. For example, a metal strip can snake back and forth such that a single heating unit can provide heat in a downward direction to a portion of the metal strip passing beneath the heating unit, as well as provide heat in an upward direction to a portion of the metal strip passing above the heating unit. Such snaking, looping, or wrapping can reduce the linear requirement of a dimensionally variable heat treatment apparatus.

In some cases, one or more heating units can generate a temperature gradient. The temperature gradient can be in a longitudinal direction (e.g., rolling direction of the metal strip). For example, the first heating unit by which the metal strip passes may generate more heat than the final heating unit by which the metal strip passes. The first heating unit can thus quickly heat up the metal strip from a cooler temperature, while subsequent heating units generating less heat can maintain the metal strip at the desired heat treatment temperature.

A dimensionally variable heat treatment apparatus can include one or more cooling units. Various types of cooling units can be used, such as fluid sprays (e.g., water jets or air knives), water-cooled panels, chilled copper rolls, thermoelectric devices, wet tissue or brushes, and others. The cooling unit can absorb heat from the metal strip and/or the air near the region not to be treated so that the temperature of the metal strip in the region not to be treated is maintained at a sufficiently low temperature so that tempering does not occur. In some cases, a cooling unit may be located only adjacent an edge of a heating unit, as the cooling unit only needs to extract sufficient heat so that thermal conduction does not cause the metal in the region not be treated to raise above a maximum limit. For example, in a laterally variable heat treatment apparatus, a heating unit may extend from a first edge to the middle of the width of the metal strip and the cooling unit may be located only adjacent the middle of the width of the metal strip and may not extend to the second edge of the metal strip. In some cases, cooling units can be located at multiple edges of a heating unit. For example, in a laterally variable heat treatment apparatus, a cooling unit can be located adjacent a lateral edge of the heating unit and one or more cooling units can be located adjacent longitudinal edges of the heating unit (e.g., to quickly cool off the treated region of the metal strip after that portion of the metal strip has passed the heating unit or last heating unit). In some cases, the cooling unit can be located proximate the metal strip as the metal strip moves horizontally, vertically, or diagonally between rollers or other supports. In some cases, a cooling unit can be incorporated into one or more rollers.

In some cases, a dimensionally variable heat treatment apparatus can include motors, actuators, pneumatics, or other devices for manipulating the positioning of the heating unit(s) and cooling unit(s) to adjust the location of the separation plane. For example, in a width-variable heat treatment apparatus, the heating unit(s) and cooling unit(s) may be laterally adjustable to laterally move the separation plane. In some cases, a positioning apparatus can manipulate the position of the heating unit(s) and cooling unit(s) dynamically during the processing of a metal strip, such as to provide a metal strip having width-variable heat treatment where the lateral placement of the separation plane changes as a function of longitudinal distance along the metal strip. In some cases, the shape of a plot depicting the separation plane as a function of longitudinal distance along the metal strip may not be linear, and may comprise complex shapes tailored for specific purposes.

In some cases, a marking apparatus can include a device to automatically mark the metal strip to indicate dimensionally variable heat treatment has been performed on the metal strip. The marking apparatus can include a printer for depositing ink on a surface of the metal strip, a laser for engraving a pattern on the surface of the metal strip, or any other suitable device for placing an indication on the metal strip. The indication can be repeated multiple times along the length of the metal strip or can be placed in a single location along the length of a single metal strip.

Tailored metal strips can enable metal components with tailored properties, such as strength and ductility. These tailored metal components can allow for expanded design options, such as reduction in the gauge or thickness of a component. For example, a metal component, such as an automotive B pillar, may require a certain minimum ductility for forming and may require a certain minimum gauge to provide the necessary structural support given the strength properties of the uniformly tempered metal. The same component can be created using the dimensionally variable heat treatment aspects disclosed herein and provide the necessary ductility in certain regions, while providing enhanced strength in other regions, thus enabling the same component to be formed of a smaller gauge metal. Enhanced abilities such as these can help reduce cost in materials used and can help reduce wear on forming equipment.

An example component includes a crash member having a thickness-variable heat treatment resulting in an exterior surface that is softer (e.g., T4 temper) than the strong inner surface (e.g., T61 temper). The inner surface of the crash member can accept a higher load and absorb higher energy than the softer outside. Such a crash member can be formed using otherwise less desirable alloys. Such a crash member can also be formed with bends having smaller radii than a uniformly heat treated component. Additionally, a crash member formed using dimensionally variable heat treatment can have a smaller gauge than a uniformly heat treated component.

In this description, reference is made to alloys identified by AA numbers and other related designations, such as "series" or "7xxx." For an understanding of the number designation system most commonly used in naming and identifying aluminum and its alloys, see "International Alloy Designations and Chemical Composition Limits for Wrought Aluminum and Wrought Aluminum Alloys" or "Registration Record of Aluminum Association Alloy Designations and Chemical Compositions Limits for Aluminum Alloys in the Form of Castings and Ingot," both published by The Aluminum Association.

Aspects and features of the present disclosure may be especially suitable for use with aluminum alloys, such as 6xxx, 2xxx, or 7xxx series aluminum alloys. In some cases, aluminum alloys that may perform especially well after application of certain aspects and features of the present disclosure (e.g., dimensionally variable heat treatment) can include AA2008, AA2013, AA2014, AA2017, AA2024, AA2036, AA2124, AA2324, AA2524, AA4045, AA6002, AA600315, AA6005, AA6005A, AA6005B, AA6005C, AA6006, AA6008, AA6009, AA6010, AA6011, AA6012, AA6012A, AA6013, AA6014, AA6015, AA6016, AA6016A, AA6018, AA6019, AA6020, AA6021, AA6022, AA6023, AA6024, AA6025, AA6026, AA6028, AA6033, AA6040, AA6041, AA6042, AA6043, AA6053, AA6056, AA6060, AA6061, AA6061A, AA6063, AA6063A, AA6064, AA6064A, AA6065, AA6066, AA6069, AA6070, AA6081, AA6082, AA6082A, AA6091, AA6092, AA6101, AA6101A, AA6101B, AA6103, AA6105, AA6106, AA6110, AA6110A, AA6111, AA6113, AA6116, AA6151, AA6156, AA6160, AA6162, AA6181, AA6181A, AA6182, AA6201, AA6201A, AA6205, AA6206, AA6260, AA6261, AA6262, AA6262A, AA6306, AA6351, AA6351A, AA6360, AA6401, AA6451, AA6460, AA6463, AA6463A, AA6501, AA6560, AA6600, AA6763, AA6951, AA6963, AA7019, AA7020, AA7021, AA7022, AA7029, AA7046, AA7050, AA7055, AA7075, AA7085, AA7089, AA7155, and AA8967. Any of the aforementioned aluminum alloys, as well as other alloys, can be used for various portions of a dimensionally variably heat treated aluminum strip, such as the entirety of the strip, a core (e.g., interior region) of the strip, a clad (e.g., exterior region) of the strip, or any other portions of the strip. In some cases, a fusion alloy (e.g., an alloy with a clad and a core, such as a AA4045 clad and a AA6011 core) can be dimensionally variably heat treated. In some cases, the ability to perform dimensionally variable heat treatment on aluminum alloys can allow components to be formed from aluminum when such components would otherwise normally be formed from steel.

As used herein, the meaning of "room temperature" or "ambient temperature" can include a temperature of from about 15° C. to about 30° C., for example about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., or about 30° C. As used herein, the meaning of "ambient conditions" can include temperatures of about room temperature, relative humidity of from about 20% to about 100%, and barometric pressure of from about 975 millibar (mbar) to about 1050 mbar. For example, relative humidity can be about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, about 100%, or anywhere in between. For example, barometric pressure can be about 975 mbar, about 980 mbar, about 985 mbar, about 990 mbar, about 995 mbar, about 1000 mbar, about 1005 mbar, about 1010 mbar, about 1015 mbar, about 1020 mbar, about 1025 mbar, about 1030 mbar, about 1035 mbar, about 1040 mbar, about 1045 mbar, about 1050 mbar, or anywhere in between.

All ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Unless stated otherwise, the expression "up to" when referring to the compositional amount of an element means that element is optional and includes a zero percent composition of that particular element. Unless stated otherwise, all compositional percentages are in weight percent (wt. %).

As used herein, the meaning of "a," "an," and "the" includes singular and plural references unless the context clearly dictates otherwise.

The aluminum alloy products described herein can be used in automotive applications and other transportation applications, including aircraft and railway applications. For example, the disclosed aluminum alloy products can be used to prepare automotive structural parts, such as bumpers, side beams, roof beams, cross beams, pillar reinforcements (e.g., A-pillars, B-pillars, and C-pillars), inner panels, outer panels, side panels, inner hoods, outer hoods, or trunk lid panels. The aluminum alloy products and methods described herein can also be used in aircraft or railway vehicle applications, to prepare, for example, external and internal panels.

The aluminum alloy products and methods described herein can also be used in electronics applications. For example, the aluminum alloy products and methods described herein can be used to prepare housings for electronic devices, including mobile phones and tablet computers. In some examples, the aluminum alloy products can be used to prepare housings for the outer casing of mobile phones (e.g., smart phones), tablet bottom chassis, and other portable electronics.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative embodiments but, like the illustrative embodiments, should not be used to limit the present disclosure. The elements included in the illustrations herein may not be drawn to scale. For example, the various components and regions in the following figures may be exaggerated or diminished in size for purposes of clarity.

FIG. 1 is an axonometric diagram of a metal processing system 100 for providing width-variable heat treatment to a metal strip 102 according to certain aspects. A metal strip 102 can pass through the metal processing system 100 in direction 118. The metal processing system 100 can be part of a larger processing system, such as a CASH line, a blanking line, a slitting line, or other line.

The metal processing system 100 can include a dimensionally variable heat treatment apparatus 116. As shown in FIG. 1, the dimensionally variable heat treatment apparatus 116 is a width-variable heat treatment apparatus having a top heating unit 110, a bottom heating unit 108, a top cooling unit 114, and a bottom cooling unit (not visible). The bottom and top heating units 108, 110 can provide sufficient heat for a sufficient distance to heat treat (e.g., temper) a first region 122 of the metal strip 102. Meanwhile, the bottom cooling unit and top cooling unit 114 can provide sufficient cooling to keep a second region 124 from being heat treated. A separation plane 120 is an imaginary plane intersecting the metal strip 102 between the first region 122 and second region 124.

In some cases, the dimensionally variable heat treatment apparatus 116 can be laterally positionable along directions 126. In some cases, lateral positioning of the dimensionally variable heat treatment apparatus 116 can occur between runs. In some cases, lateral positioning of the dimensionally variable heat treatment apparatus 116 can occur dynamically during a run, such as to change the lateral position of the separation plane 120 along the width 130 of the metal strip 102 as a function of longitudinal distance along the metal strip 102. Lateral positioning of the dimensionally variable heat treatment apparatus 116 can be manual or automatic. Any suitable lateral positioning mechanism can be used, such as stationary mechanisms like a lateral track upon which the heating units 108, 110 and cooling units 114 can slide and can be locked into place (e.g., by clamps, cotter pints, or the like) manually. In some cases, the lateral positioning mechanism can include a linear actuator, such as a pneumatic, hydraulic, screw-based, or other linear actuator. A linear actuator may be controllable by controller 101 to automatically laterally position the dimensionally variable heat treatment apparatus 116, such as during or between runs.

In some cases, the intensity of the heating units 108, 110 and/or the cooling units 114 can be adjusted dynamically during a run. Adjusting the intensity can change the lateral position of the separation plane 120 along the width 130 of the metal strip 102 as a function of longitudinal distance along the metal strip 102. In some cases, adjusting the intensity as such can change the amount of tempering as a function of longitudinal distance along the metal strip 102.

In some cases, a metal processing system 100 can optionally include an initial heat treating apparatus 104 and/or a final heat treating apparatus 106. Each of the initial and final heat treating apparatuses 104, 106 can include heating equipment suitable for providing some degree of uniform heat treatment to the metal strip. The combination of uniform heat treatment by an initial and/or final heat treating apparatus 104, 106 and the dimensionally variable heat treatment apparatus 116 can result in a uniquely tailored metal strip.

In some cases, a metal processing system 100 can be controlled by a controller 101. The controller 101 can be one or more devices suitable for controlling one or more parameters of the dimensionally variable heat treatment apparatus 116, such as temperature, vertical positioning of the heating units 108, 110 and/or cooling units 114, lateral positioning of the heating units 108, 110 and/or cooling units 114 in directions 126, or other parameters. Controller 101 can include one or more processors, microprocessors, analog circuits, feedback circuits, sensors (e.g., to detect speed of the metal strip 102 in direction 118, to detect position of some part of the dimensionally variable heat treatment apparatus 116, and/or to detect a temperature of some portion of the metal strip), or other devices.

Figure 2:
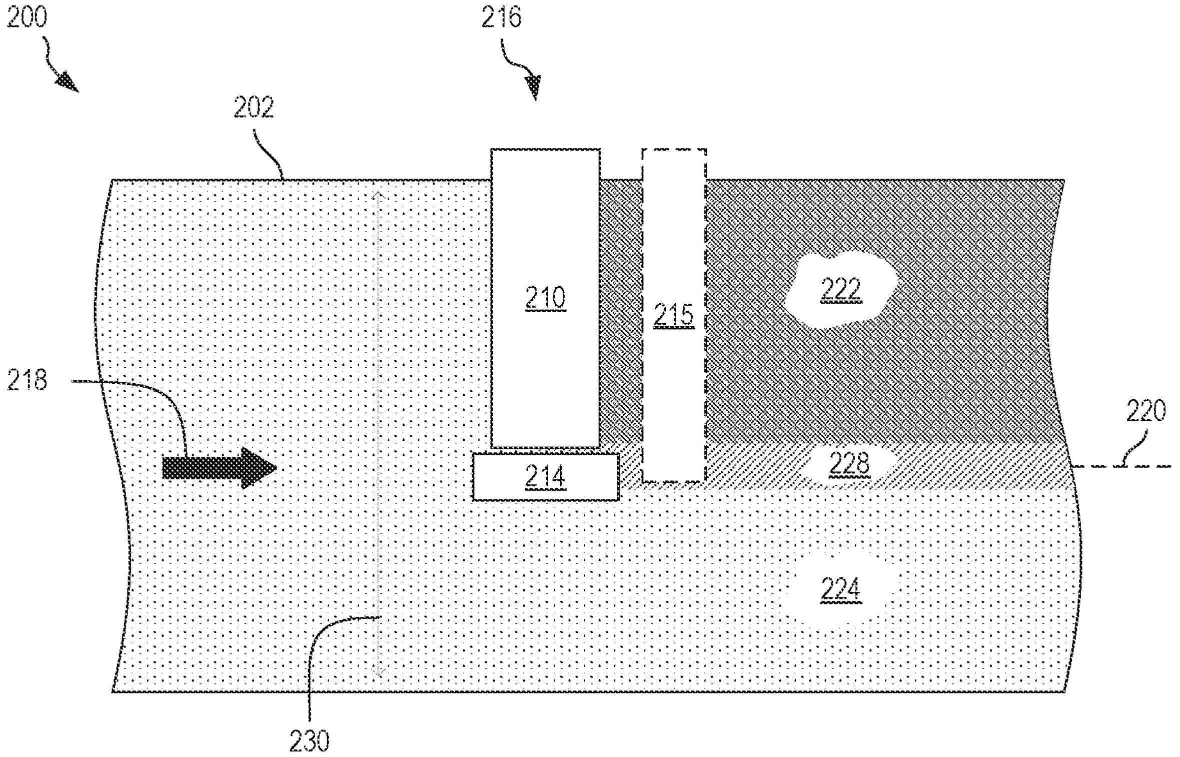
FIG. 2 is a top view of a metal processing system for providing width-variable heat treatment to a metal strip.

FIG. 2 is a top view of a metal processing system 200 for providing width-variable heat treatment to a metal strip 202 according to certain aspects. The metal processing system 200 can be similar to the metal processing system 100 of FIG. 1. The metal strip 202 can move in direction 218 (e.g., a rolling or movement direction). The metal strip can pass a width-variable heat treatment apparatus 216 having a top heating unit 210 and a top cooling unit 214. The width-variable heat treatment apparatus 216 can further include a bottom heating unit and bottom cooling unit located opposite the metal strip 202 from the top heating unit 210 and top cooling unit 214, respectively. The width-variable heat treatment apparatus 216 can apply heat treatment that varies across the width 230 of the metal strip 202.

The metal strip 202 includes an untreated region 224. The untreated region 224 is the portion of the metal strip that has not been treated by the width-variable heat treatment apparatus 216. As used herein, the term "untreated region" can refer to a region that has not been treated by a dimensionally variable heat treatment apparatus, even if that region has been or will be treated by another heat treatment apparatus. For example, the metal strip 202 in FIG. 2 may initially have a T4 temper throughout before passing the width-variable heat treatment apparatus 216, in which case the untreated region 224 would maintain the T4 temper. In some cases, an untreated region can refer to a minimally-treated or low-treated region that may have a minimal amount of heat treatment applied but is not specifically treated to the extent of the treated region.

The metal strip 202 further includes a treated region 222. A treated region can refer to a region that has been treated by a dimensionally variable heat treatment apparatus, such as treated region 222 being heat treated by the width-variable heat treatment apparatus 216. The treated region 222 can have a temper that is different from the untreated region 224. The treated region 222 can be artificially aged through heat treatment by the bottom heating unit and top heating unit 210. The untreated region 224 can remain untreated because the bottom heating unit and top heating unit 210 do not extend into the untreated region 224 and because the bottom cooling unit and top cooling unit 214 border the bottom heating unit and top heating unit 210, respectively, to keep substantial heat from transferring into the untreated region 224.

A transition region 228 can exist between the treated region 222 and the untreated region 224. The transition region 228 can include metal that has been partially heated by the bottom heating unit and top heating unit 210, but has not undergone the full heat treatment seen in the treated region 222. In some cases, the location of the transition region 228 may correlate with the boundary between a heating unit and a cooling unit, such as top heating unit 210 and top cooling unit 214. The width of the transition region 228 may be small or large, depending on the amount of heat applied to the metal strip 202 by a heating unit and the amount of heat absorbed from the metal strip 202 by a cooling unit. In some cases, the width of the transition region 228 can be controlled by movement of a heating unit or cooling unit (e.g., moving cooling unit 214 further away from heating unit 210 or further away from the top surface of metal strip 202) or by adjusting the amount of heating or cooling applied by the heating unit or cooling unit, respectively. The separation plane 220 is shown at the transition region 228.

Figure 3:
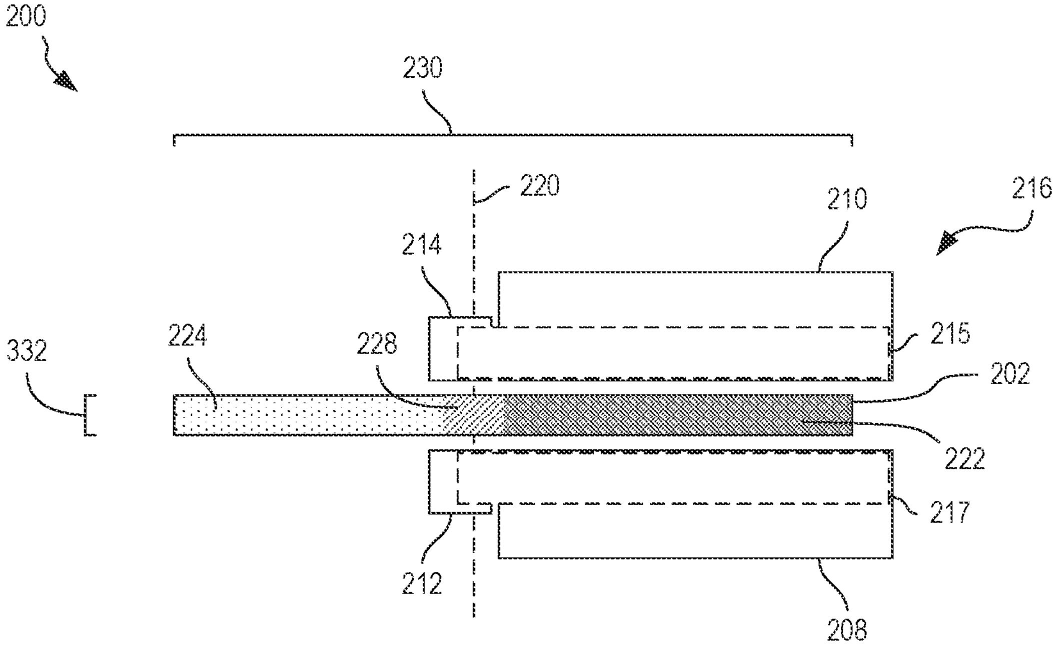
FIG. 3 is a front sectional view of the metal processing system of FIG. 2.

FIG. 3 is a front sectional view of the metal processing system 200 of FIG. 2 according to certain aspects of the present disclosure. The bottom and top heating units 208, 210 are located on opposite sides of the metal strip 202. The bottom and top cooling units 212, 214 are located on opposite sides of the metal strip 202. The width-variable heat treatment apparatus 216 can apply heat treatment that varies across the width 230 of the metal strip. The width-variable heat treatment can result in a metal strip 202 having an untreated region 224 located opposite a separation plane 220 from a treated region 222. A transition region 228 can be located between the untreated region 224 and treated region 222. The metal strip 202 can have a height 332. In some cases, the heat treatment can be uniform across the height 332 of the metal strip 202 within the treated region 222, although that need not be the case.

In some cases, optional downstream cooling units (e.g., top downstream cooling unit 215 and bottom downstream cooling unit 217) can be located downstream of the heating units (e.g., top heating unit 210 and bottom heating unit 208). The downstream cooling units can cool the strip 202 down after it has been heat treated by the heating units. In some cases, the downstream cooling units can cool the strip 202 down to a desired temperature, such as ambient temperature or another desired temperature below a heat treatment temperature. The downstream cooling units can minimize uncontrolled heat treatment over the width of the strip 202 after the heat treatment applied by the heating units.

Figure 4:
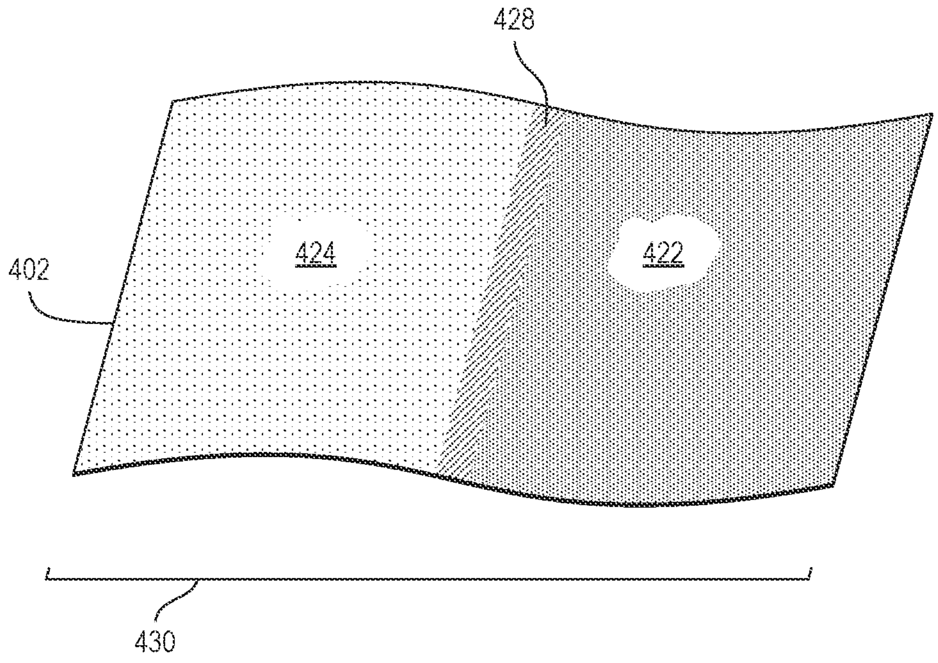
FIG. 4 is an axonometric diagram of a tailored metal strip that has undergone width-variable heat treatment before forming.

FIG. 4 is an axonometric diagram of a tailored metal strip 402 that has undergone width-variable heat treatment before forming according to certain aspects of the present disclosure. The metal strip 402 has been heat treated with width-variable heat treatment to result in heat treatment that varies across the width 430 of the metal strip 402. The metal strip 402 can include a treated region 422 and an untreated region 424. A transitional region 428 mat exist at the boundary between the treated region 422 and the untreated region 424.

Figure 5:
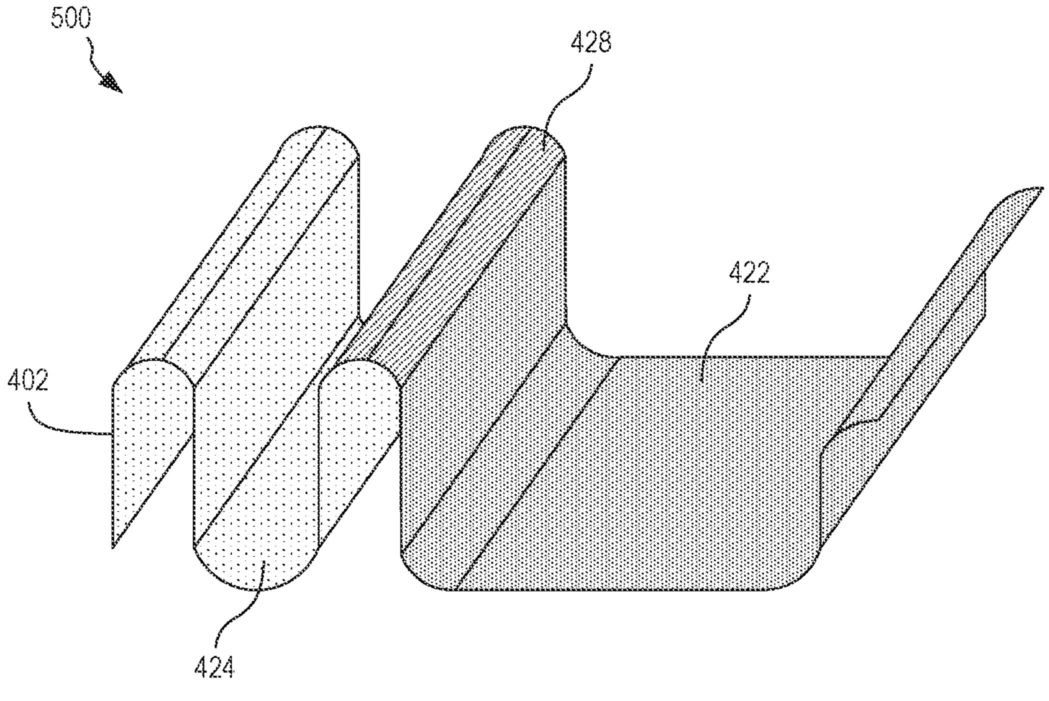
FIG. 5 is an axonometric diagram of a metal component formed from the tailored metal strip of FIG. 4.

FIG. 5 is an axonometric diagram of a metal component 500 formed from the tailored metal strip 402 of FIG. 4 according to certain aspects of the present disclosure. The metal component 500 may have been formed through drawing, pressing, or bending of the tailored metal strip 402, although other methods of forming could be used. The metal component 500 can include areas where high ductility is desirable (e.g., where the metal component 500 includes bends and the like) and areas where high strength is desirable (e.g., at some generally flat portions of the metal component 500). The tailored metal strip 402 may be oriented so that the bends are concentrated in the untreated region 424, whereas the areas requiring high strength are concentrated in the treated region 422. The transitional region 428 can be located between the untreated region 424 and treated region 422. In some cases, the width of the transitional region 428 can be specifically sized to have a desired width, such as a width that is equal to a certain feature of the metal component 500 (e.g., a width of a bend).

Figure 6:
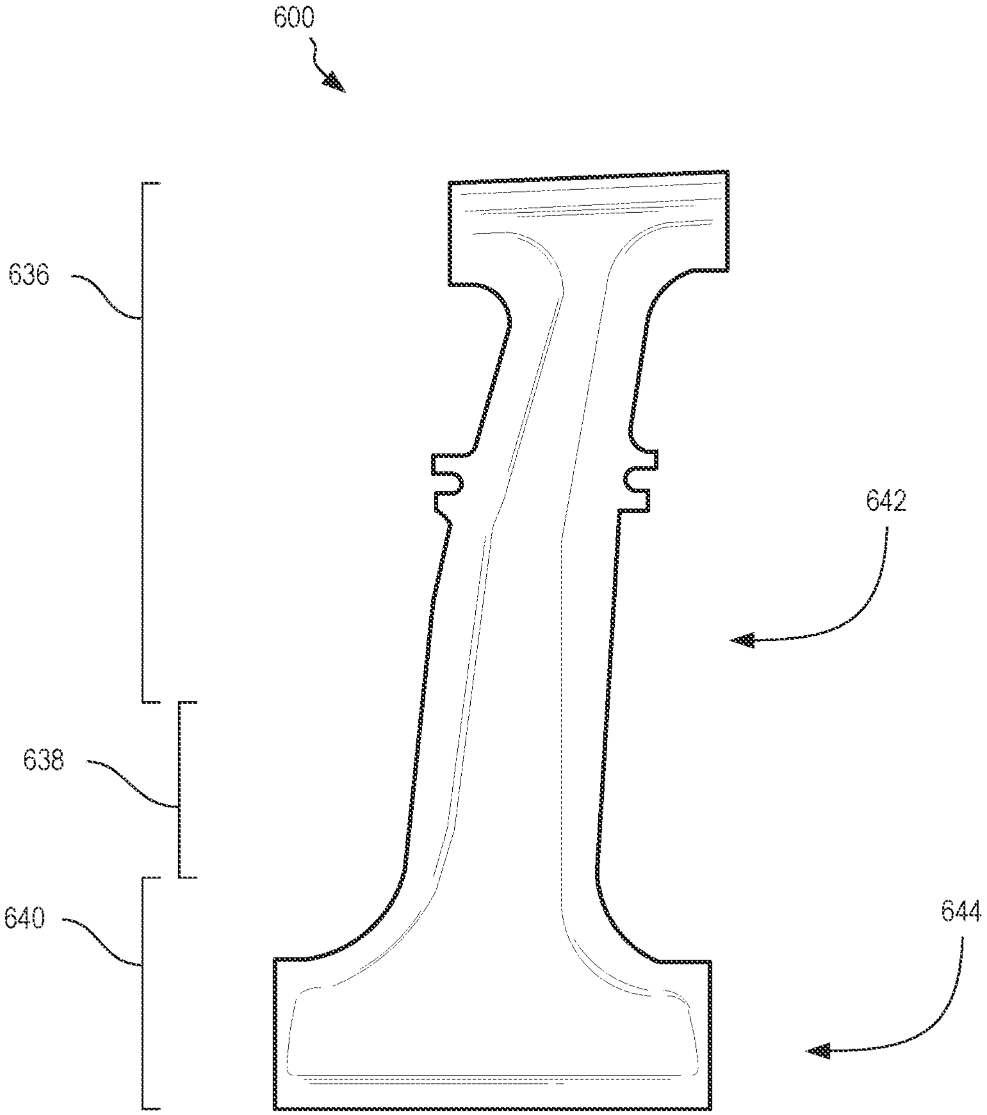
FIG. 6 is a front view of a formed metal component made from a tailored metal strip.

FIG. 6 is a front view of a formed metal component 600 made from a tailored metal strip according to certain aspects of the present disclosure. The metal component 600 can be a structural support, such as a B pillar form a vehicle. The component 600 can be formed from a tailored metal strip, such as the metal strip 1002 depicted in FIG. 10. The component 600 can thus include a treated region 636, a transitional region 638, and an untreated region 640.

The treated region 636 can be heat treated during a dimensionally variable heat treatment process to be tempered, such as to T61 temper (e.g., at 230 Mpa, 370 Mpa, or others), to provide increased strength. The treated region 636 can correspond to the center body 642 of the B pillar, where improved strength can bring many advantages, such as increased crushing resistance or the ability to produce the component 600 with thinner gauge metal.

The untreated region 640 can be left untreated during the dimensionally variable heat treatment process. In some cases, the untreated region 640 can be tempered to T4 temper. The untreated region 640 can correspond to the bottom portion 644 of the B pillar, where improved ductility can bring advantages, such as resistance to cracking during formation. The improved ductility can allow the metal strip to be formed into the component 600, especially where difficult or substantial bends are necessary.

Figure 7:
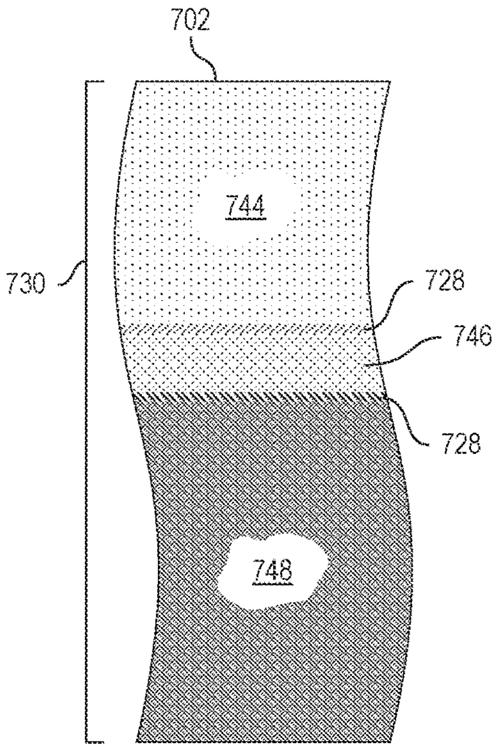
FIG. 7 is a top view of a segment of tailored metal strip having a medium strength region located laterally between a low strength region and a high strength region.

FIG. 7 is a top view of a segment of tailored metal strip 702 having a medium strength region 746 located laterally between a low strength region 744 and a high strength region 748 according to certain aspects of the present disclosure. Transition regions 728 can be located between the low strength region 744 and medium strength region 746 and between the medium strength region 746 and high strength region 748. The tailored metal strip 702 can thus have several different tempers across the width 730 of the metal strip. For example, the low strength region 744 can be untreated and have a T4 temper, the medium strength region 746 can have a T61 temper with a strength of approximately 140-160 Mpa, and the high strength region 748 can have a T61 temper with a strength of about approximately 180 to approximately 200 Mpa.

Figure 8:
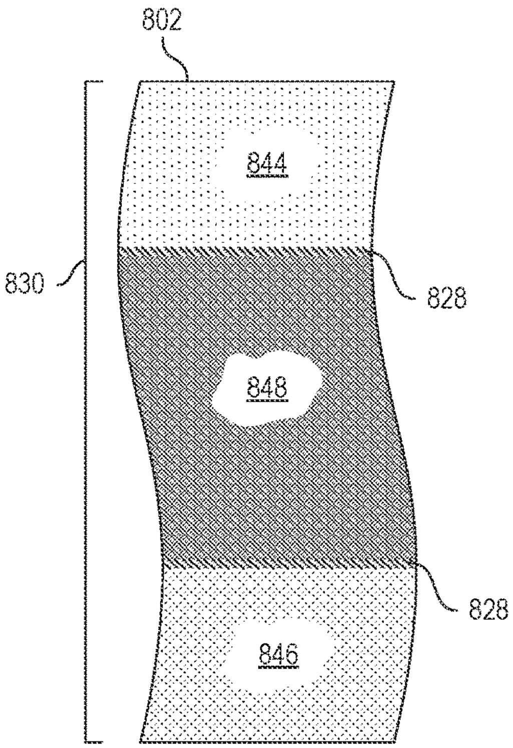
FIG. 8 is a top view of a segment of tailored metal strip having a high strength region located laterally between a low strength region and a medium strength region.

FIG. 8 is a top view of a segment of tailored metal strip 802 having a high strength region 848 located laterally between a low strength region 844 and a medium strength region 846 according to certain aspects of the present disclosure. Transition regions 828 can be located between the low strength region 844 and high strength region 848 and between the medium strength region 846 and high strength region 848. The tailored metal strip 802 can thus have several different tempers across the width 830 of the metal strip. For example, the low strength region 844 can be untreated and have a T4 temper, the medium strength region 846 can have a T61 temper with a strength of approximately 140-160 Mpa, and the high strength region 848 can have a T61 temper with a strength of about approximately 180 to approximately 200 Mpa.

Figure 9:
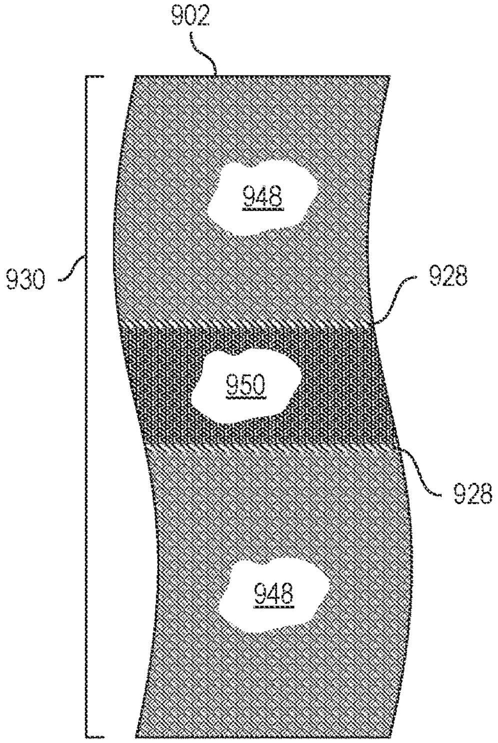
FIG. 9 is a top view of a segment of tailored metal strip having a very high strength region located laterally between two high strength regions. Transition regions can be located between the very high strength region and the high strength regions.

FIG. 9 is a top view of a segment of tailored metal strip 902 having a very high strength region 950 located laterally between two high strength regions 948 according to certain aspects of the present disclosure. Transition regions 928 can be located between the very high strength region 950 and the high strength regions 948. The tailored metal strip 902 can thus have several different tempers across the width 930 of the metal strip. In some cases, dimensionally variable heat treatment can treat the entire width of a metal strip, but treat different regions of the width with different tempers. In such examples, the separation plane separates two differently-tempered regions, rather than an untreated region and a treated region. For example, the very high strength region 950 can have a T61 temper with a strength of approximately 250 Mpa, and the high strength regions 948 can each have a T61 temper with a strength of approximately 180 to approximately 200 Mpa.

Figure 10:
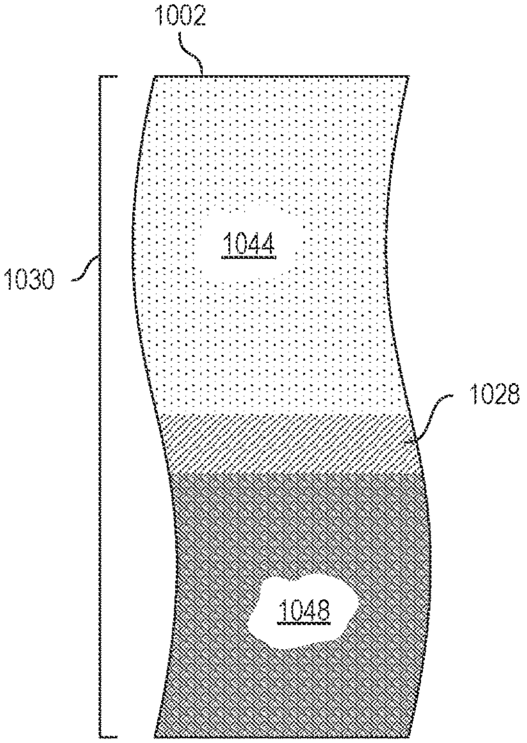
FIG. 10 is a top view of a segment of a tailored metal strip having a high strength region laterally separated from a low strength region.

FIG. 10 is a top view of a segment of a tailored metal strip 1002 having a high strength region 1048 laterally separated from a low strength region 1044 according to certain aspects of the present disclosure. The tailored metal strip 1002 can be the metal strip used to form the metal component 600 of FIG. 6. A transition region 1028 can be located between the high strength region 1048 and the low strength region 1044. The tailored metal strip 1002 can thus have several different tempers across the width 1030 of the metal strip. For example, the low strength region 1044 can be untreated and have a T4 temper, while the high strength region 1048 can have a T61 temper with a strength of approximately 180 to approximately 200 Mpa.

Figure 11:
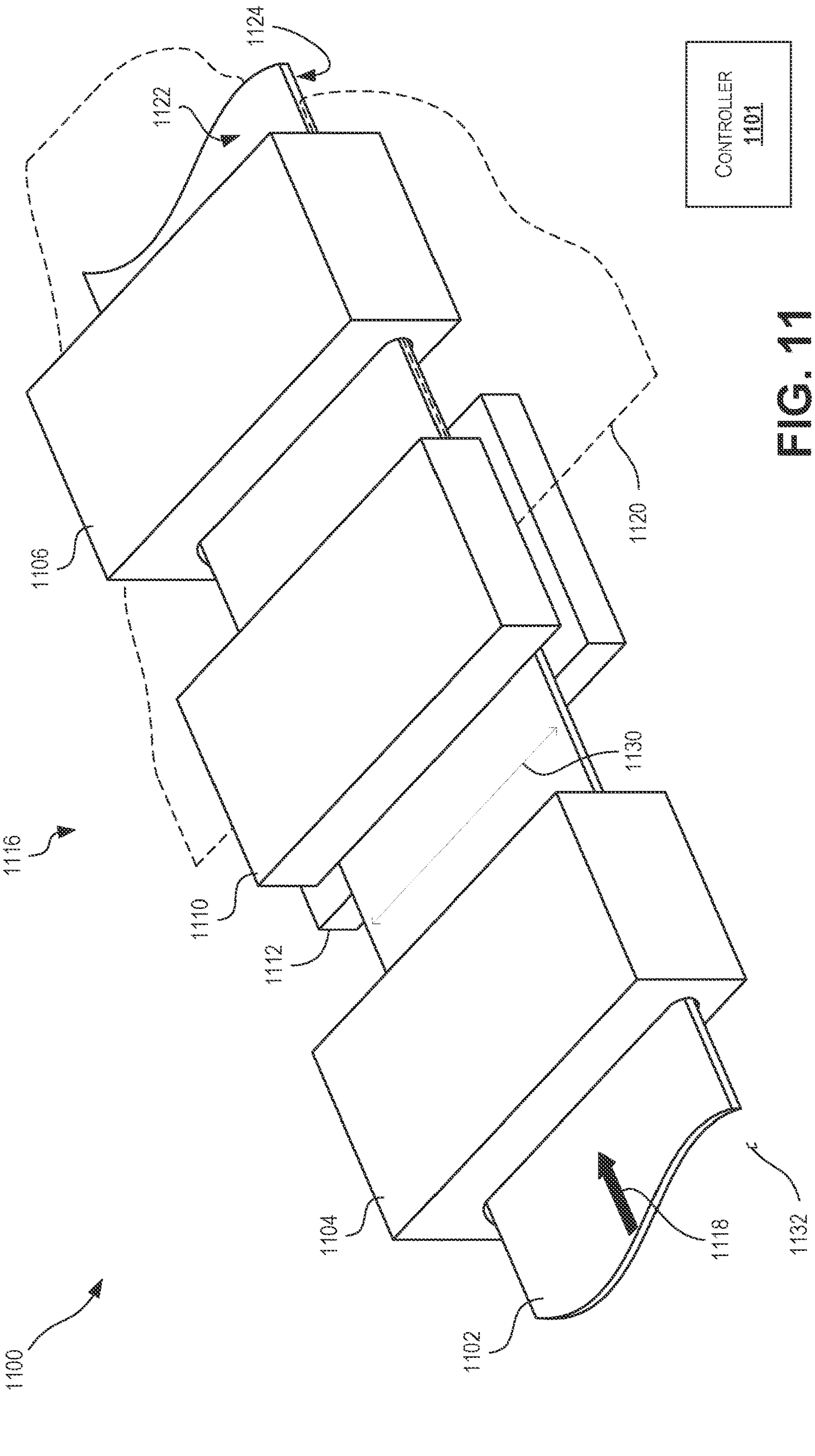
FIG. 11 is an axonometric diagram of a metal processing system for providing thickness-variable heat treatment to a metal strip.

FIG. 11 is an axonometric diagram of a metal processing system 1100 for providing thickness-variable heat treatment to a metal strip 1102 according to certain aspects of the present disclosure. A metal strip 1102 can pass through the metal processing system 1100 in direction 1118. The metal processing system 1100 can be part of a larger processing system, such as a CASH line, a blanking line, or a slitting line.

The metal processing system 1100 can include a dimensionally variable heat treatment apparatus 1116. As shown in FIG. 11, the dimensionally variable heat treatment apparatus 1116 is a thickness-variable heat treatment apparatus having a heating unit 1110 and cooling unit 1112. The heating unit 1110 can extend across the full width 1130 of the metal strip 1102, although may extend for less than the full width in some cases. The cooling unit 1112 can extend across the full width 1130 of the metal strip 1102, although may extend for less than the full width in some cases. The heating unit 1110 and/or cooling unit 1112 can extend in a longitudinal direction (e.g., in direction 1118) for a distance sufficient to apply the heat long enough to appropriately temper the metal strip 1102. The heating unit 1110 can provide sufficient heat for a sufficient distance to heat treat (e.g., temper) a first region 1122 of the metal strip 1102. The first region 1122 can be a top portion of the metal strip 1102, including the top surface of the metal strip 1102. Meanwhile, the cooling unit 1112 can provide sufficient cooling to keep a second region 1124 from being heat treated. The second region 1124 can be a bottom portion of the metal strip 1102, including the bottom surface of the metal strip 1102. A separation plane 1120 is an imaginary plane intersecting the metal strip 1102 between the first region 1122 and second region 1124.

In some cases, the intensity of the heating unit 1110 and/or the cooling unit 1112 can be adjusted dynamically during a run. Adjusting the intensity as such can change the vertical position of the separation plane 1120 along the thickness 1132 of the metal strip 1102 as a function of longitudinal distance along the metal strip 1102. In some cases, adjusting the intensity as such can change the amount of tempering as a function of longitudinal distance along the metal strip 1102.

In some cases, a metal processing system 1100 can optionally include an initial heat treating apparatus 1104 and/or a final heat treating apparatus 1106. Each of the initial and final heat treating apparatuses 1104, 1106 can include heating equipment suitable for providing some degree of uniform heat treatment to the metal strip. The combination of uniform heat treatment by an initial and/or final heat treating apparatus 1104, 1106 and the dimensionally variable heat treatment apparatus 1116 can result in uniquely tailored metal strip.

In some cases, a metal processing system 1100 can be controlled by a controller 1101. The controller 1101 can be one or more devices suitable for controlling one or more parameters of the dimensionally variable heat treatment apparatus 1116, such as temperature, vertical positioning of the heating units 1108, 1110 and/or cooling units 1114, lateral positioning of the heating units 1108, 1110 and/or cooling units 1114 in directions 1126, or other parameters. Controller 1101 can include one or more processors, microprocessors, analog circuits, feedback circuits, sensors (e.g., to detect speed of the metal strip 1102 in direction 1118, to detect position of some part of the dimensionally variable heat treatment apparatus 1116, or to detect a temperature of some portion of the metal strip), or other devices.

Figure 12:
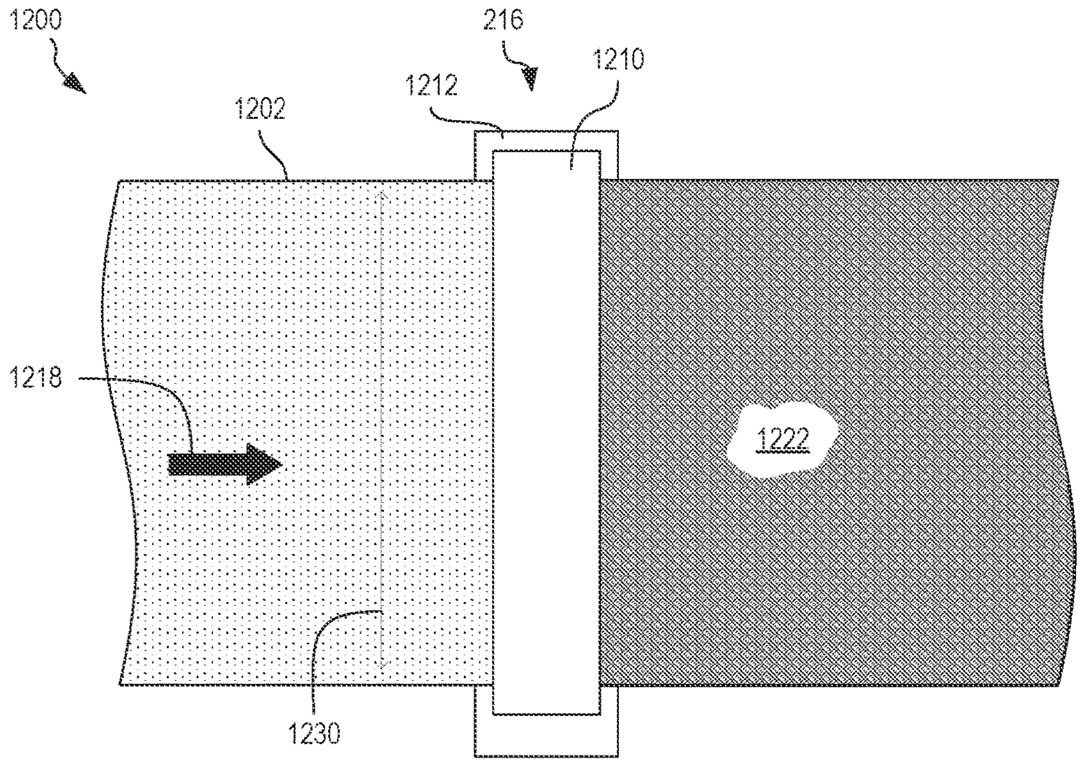
FIG. 12 is a top view of a metal processing system for providing vertically variable heat treatment to a metal strip.

FIG. 12 is a top view of a metal processing system 1200 for providing vertically variable heat treatment to a metal strip 1202 according to certain aspects of the present disclosure. The metal processing system 1200 can be similar to the metal processing system 1100 of FIG. 11. The metal strip 1202 can move in direction 1218 (e.g., a rolling or movement direction). The metal strip can pass a thickness-variable heat treatment apparatus 1216 having a heating unit 1210 and a cooling unit 1212 located on opposite sides of the metal strip 1102 from one another. The thickness-variable heat treatment apparatus 1216 can apply heat treatment that varies across the thickness of the metal strip 1202. The heating unit 1210 and/or cooling unit 1212 can apply heat treatment across the full width 1230 of the metal strip 1102.

The metal strip 1202 can include an untreated region, such as a bottom portion (not visible) of the metal strip 1202. The untreated region is that portion of the metal strip that has not been treated by the thickness-variable heat treatment apparatus 1216.

The metal strip 1202 can further include a treated region 1222. A treated region can refer to a region that has been treated by a dimensionally variable heat treatment apparatus, such as treated region 1222 being heat treated by the thickness-variable heat treatment apparatus 1216. The treated region 1222 can have a temper that is different from the untreated region. The treated region 1222 can be artificially aged through heat treatment by the heating unit 1210. The untreated region can remain untreated because the cooling unit 1212 keeps substantial heat from the heating unit 1210 and treated region 1222 from transferring into the untreated region 1224.

Figure 13:
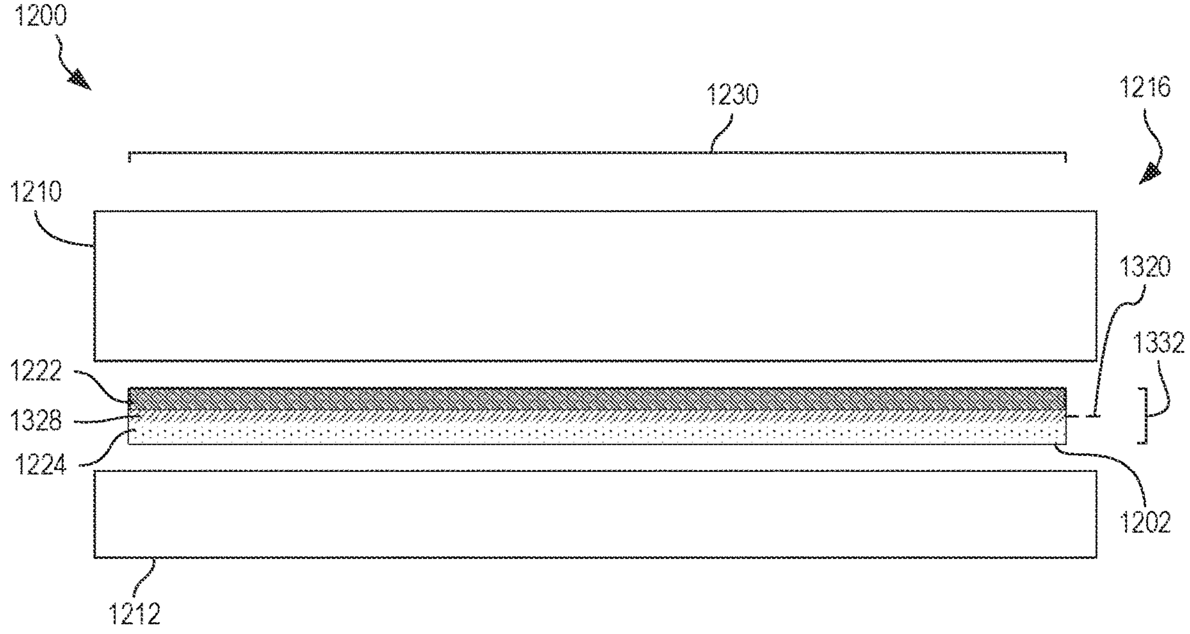
FIG. 13 is a front sectional view of the metal processing system of FIG. 12.

FIG. 13 is a front sectional view of the metal processing system 1200 of FIG. 12 according to certain aspects of the present disclosure. The heating unit 1210 and cooling unit 1212 are located on opposite sides of the metal strip 1202. The thickness-variable heat treatment apparatus 1216 can apply heat treatment that varies across the thickness 1332 of the metal strip. The thickness-variable heat treatment can result in a metal strip 1202 having an untreated region 1224 located opposite a separation plane 1320 from a treated region 1222. A transition region 1328 can be located between the untreated region 1224 and treated region 1222. The vertical position of the separation plane 1320 and height of the transition region 1328 can be adjusted by changing the intensity of heating and/or cooling applied by the thickness-variable heat treatment apparatus 1216. In some cases, the heat treatment can be uniform across the width 1230 of the metal strip 1202 within the treated region 1222, although that need not be the case.

In some cases, in order to provide sufficient heat treatment in a rapid timeframe (e.g., under 10 minutes, under 5 minutes, under 3 minutes, under 2 minutes, under 1 minute, or under 30 seconds), the temperature of the heating unit 1210 must be maintained above a minimum temperature. For example, with aluminum, a suitable minimum temperature for the heating unit 1210 can be 250° C. In some cases, because of the heat conductivity of the metal strip 1202, the cooling unit 1212 may also have a minimum temperature. If the cooling unit 1212 drops below its minimum temperature, it may remove too much heat from the heating unit 1210, pushing the heating unit 1210 below its minimum temperature. The heating unit 1210 and cooling unit 1212 can be sufficiently long to expose a portion of the metal strip to their respective temperatures for a suitable duration given the strip's speed.

In an example for thickness-variable heat treating 8967 aluminum alloy that is 2.5 mm thick, the heating unit 1210 can be set to 300° C. while the cooling unit 1212 is set to 150° C. The heating unit 1210 and cooling unit 1212 can be sufficiently long to expose the metal strip for a duration of 180 seconds. For the thickness-variable heat treated metal, the $R_{p0.2}$ (e.g., 0.2% offset yield strength) is approximately 195 MPa, the $R_m$ (e.g., tensile strength) is approximately 275 MPa, the $A_g$ (e.g., percent of non-proportional elongation at maximum force) is approximately 14%, and the $A_{80}$ (e.g., percent elongation at fracture indexed to an original gauge length of 80 mm) is approximately 17%. Additionally, the F factor of the treated surface (e.g., surface of treated region 1222) can increase faster than the low-treated surface (e.g., surface of untreated region 1224). The F factor of the treated surface can be approximately 0.9 and the f factor of the untreated surface can remain low at approximately 0.7. Other aluminum alloys can be thickness-variably heat treated, as well as other gauges, such as those listed above.

F factor, or hemming ratio, can be associated with a sample's ability to be hemmed, or the sample's ability to be bent or folded around a small radius of an adjacent material (e.g., around the thickness of an adjacent piece of material). F factor can be assessed by supporting a sample on a set of horizontally displaced supports and deforming the sample from above the supports using one or more punches with varying punch radii. The F factor is related to the smallest radius punch capable of bending the sample without surface cracks developing on the material. The F factor can be calculated as the minimum radius divided by the thickness of the sample before deformation. For example, a sample with an F factor of 0.9 and a thickness of 2.5 mm may be able to withstand folding around a radius of 2.25 mm.

In an example for thickness-variable heat treating 8967 aluminum alloy that is 2.5 mm thick, the heating unit 1210 can be set to 300° C. while the cooling unit 1212 is set to 200° C. The heating unit 1210 and cooling unit 1212 can be sufficiently long to expose the metal strip for a duration of 180 seconds. For the thickness-variable heat treated metal, the $R_{p0.2}$ is approximately 245 MPa, the $R_m$ is approximately 290 MPa, the $A_g$ is approximately 10%, and the $A_{80}$ is approximately 13%. The F factor without pre-strain of the treated surface can be approximately 0.9 and the F factor of the low-treated surface can remain low at approximately 0.8.

In an example for thickness-variable heat treating AA6451 aluminum alloy that is 0.9 mm thick, the heating unit 1210 can be set to 300° C. while the cooling unit 1212 is set to 150° C. The heating unit 1210 and cooling unit 1212 can be sufficiently long to expose the metal strip for a duration of 180 seconds. For the thickness-variable heat treated metal, the $R_{p0.2}$ is approximately 160 MPa, the $R_m$ is approximately 248 MPa, the $A_g$ is approximately 14%, and the $A_{80}$ is approximately 17%. The F factor without pre-strain of the treated surface can be approximately 0.7 and the F factor of the low-treated surface can remain low at approximately 0.6.

In an example for thickness-variable heat treating AA6451 aluminum alloy that is 0.9 mm thick, the heating unit 1210 can be set to 300° C. while the cooling unit 1212 is set to 200° C. The heating unit 1210 and cooling unit 1212 can be sufficiently long to expose the metal strip for a duration of 180 seconds. For the thickness-variable heat treated metal, the $R_{p0.2}$ is approximately 200 MPa, the $R_m$ is approximately 260 MPa, the $A_g$ is approximately 11%, and the $A_{80}$ is approximately 13.5%. The F factor without pre-strain of the treated surface can be approximately 0.73 and the F factor of the low-treated surface can be approximately 0.67.

While these times provide certain suitable times and temperatures, other times and temperatures may be used, such as times and temperatures within 20%, 15%, 10%, 8%, or 5% of the times and temperatures mentioned above.

Figure 14:
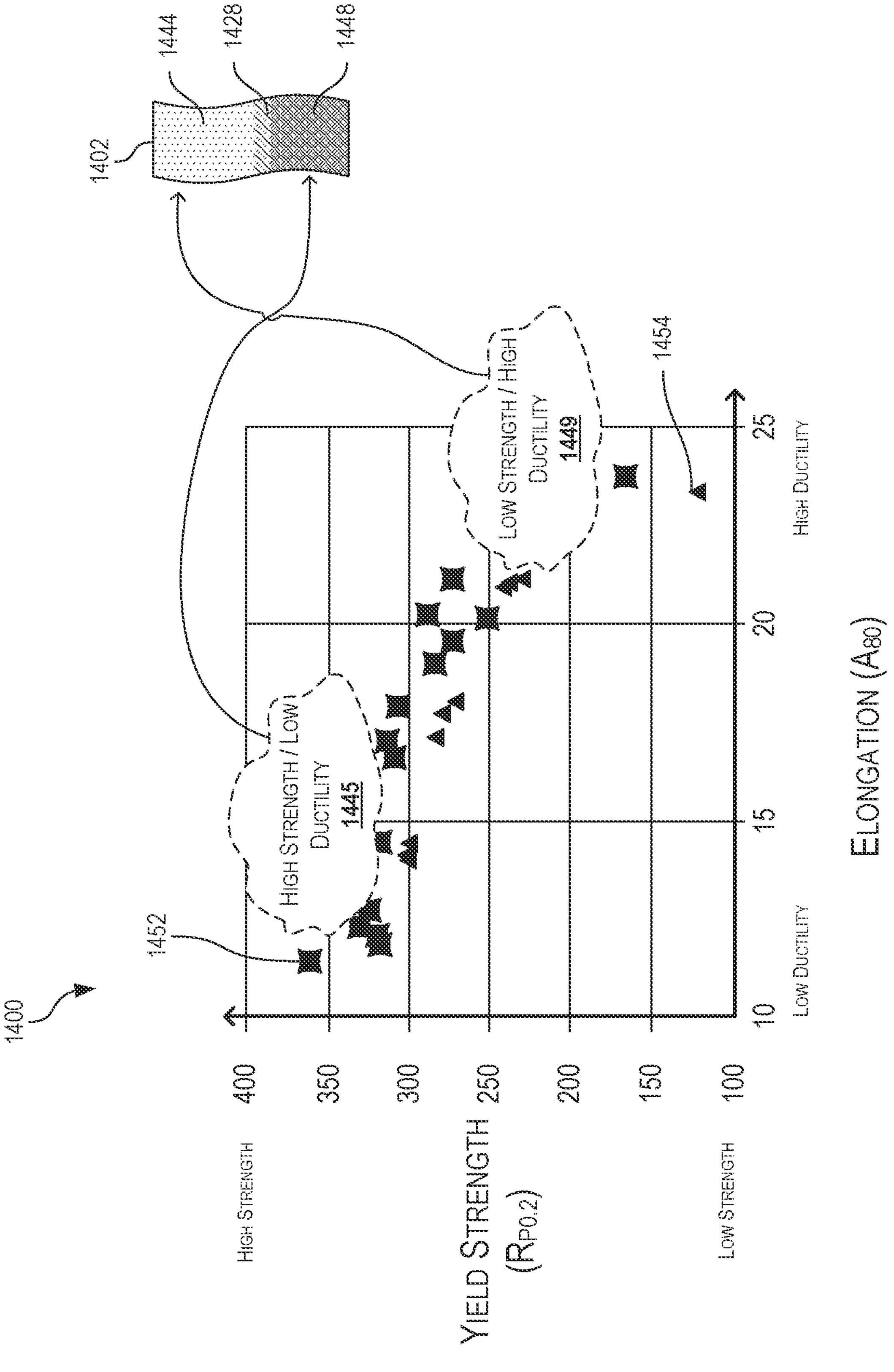
FIG. 14 is a combination diagram depicting a plot showing the relationship between yield strength and elongation for first and second metal compositions and an example metal strip.

FIG. 14 is a combination diagram depicting a plot 1400 showing the relationship between yield strength and elongation for first and second metal compositions 1452, 1454 and an example metal strip 1402 according to certain aspects of the present disclosure. The plot 1400 depicts elongation along the x-axis and yield strength along the y-axis. The values depicted in plot 1400 are examples of values for aluminum alloys, although other ranges may be present in some aluminum alloys or other metal compositions. As seen in plot 1400, as the elongation increases from low ductility to high ductility, the yield strength of the metal decreases. Likewise, as the yield strength of the metal increases, the elongation decreases to low ductility. Therefore, metals such as aluminum alloys generally fall into a grouping 1445 having high strength and low ductility, a grouping 1449 having low strength and high ductility, or somewhere in-between, as seen in plot 1400. In some cases, a metal with a T4 temper can be in grouping 1449, whereas a metal with T6 temper can be in grouping 1445. A metal with T61 grouping can e located in-between grouping 1445 and grouping 1449.

Referring to the example metal strip 1402, which can be similar to the metal strip 1002 of FIG. 10, the low strength region 1444 can be a T4 temper and can be described as being in grouping 1449. The high strength region 1448 can be a T6 or T61 temper and can be described as being in grouping 1445. The transitional region 1428 can be located on plot 1400 somewhere between grouping 1445 and grouping 1449.

Figure 15:
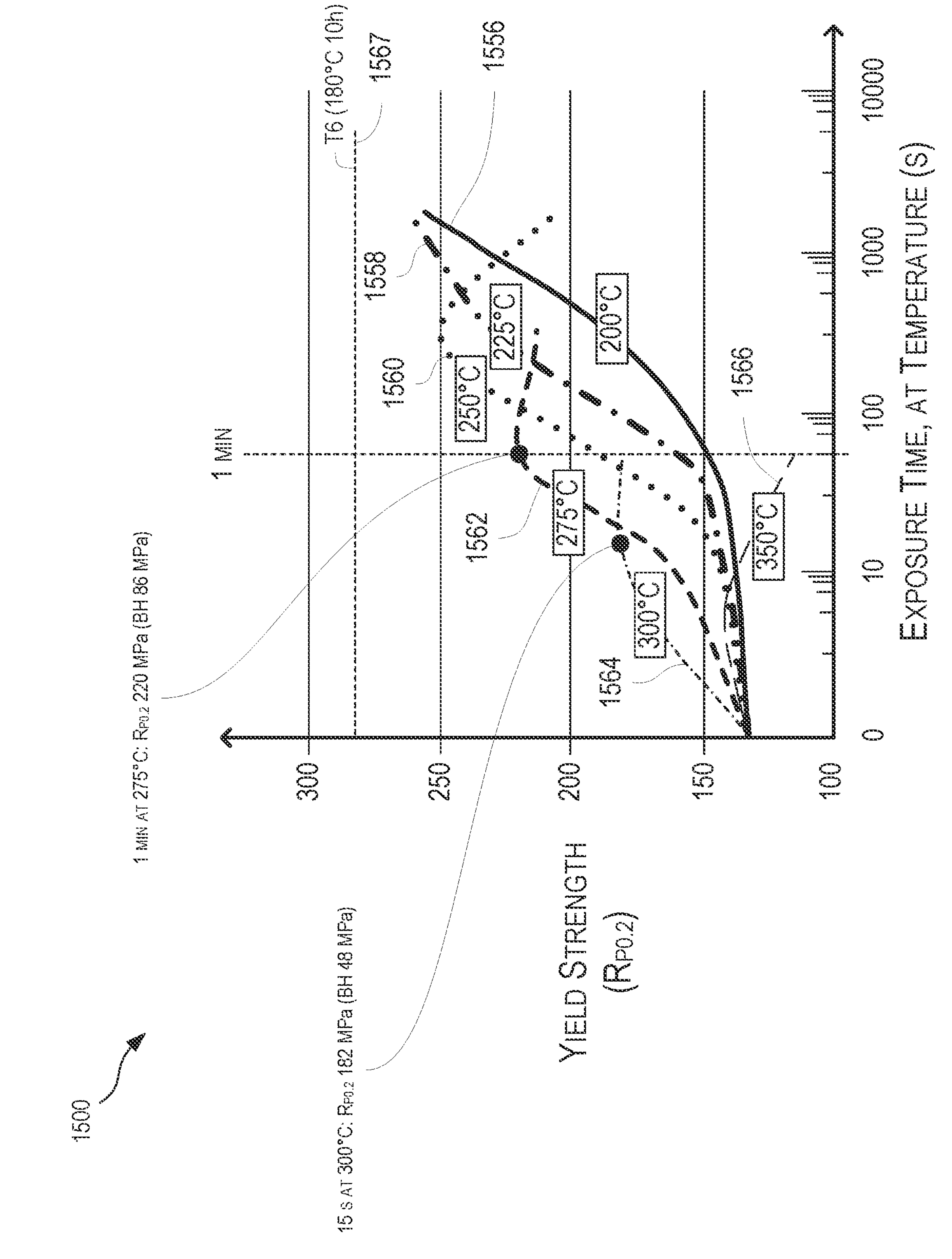
FIG. 15 is a plot depicting the relationship between yield strength and the exposure time at temperature for an example aluminum alloy for several heat treatment temperatures.

FIG. 15 is a plot 1500 depicting the relationship between yield strength and the exposure time at temperature for an example aluminum alloy for several heat treatment temperatures 1556, 1558, 1560, 1562, 1564, 1566 according to certain aspects of the present disclosure. The plot 1500 depicts exposure time at temperature (e.g., at each of the various heat treatment temperatures 1556, 1558, 1560, 1562, 1564, 1566) along the x-axis, logarithmically. The plot 1500 depicts yield strength along the y-axis. The values depicted in plot 1500 are examples of values for certain aluminum alloys, although other ranges may be present in some aluminum alloys or other metal compositions. Line 1567 depicts the strength achieved through standard T6 heat treatment at approximately 180° C. for approximately 10 hours.

Plot 1500, or similar plots, can be used to determine the appropriate temperatures, dimensions, speeds, and other variables for setting up and using dimensionally variable heat treatment apparatuses, such as those disclosed herein.

Plot 1500 includes a line for temperature 1556, depicting the effects of heat treatment of the aluminum alloy at approximately 200° C. A line for temperature 1558 depicts the effects of heat treatment of the aluminum alloy at approximately 225° C. A line for temperature 1560 depicts the effects of heat treatment of the aluminum alloy at approximately 250° C. A line for temperature 1562 depicts the effects of heat treatment of the aluminum alloy at approximately 275° C. A line for temperature 1564 depicts the effects of heat treatment of the aluminum alloy at approximately 300° C. A line for temperature 1566 depicts the effects of heat treatment of the aluminum alloy at approximately 350° C.

Two example points are identified on plot 1500. On the line for temperature 1562, the metal can be heated for one minute at 275° C. to result in a yield strength of approximately 220 Mpa, with a further increase of approximately 86 Mpa during bake hardening. On the line for temperature 1564, the metal can be heated for fifteen seconds at 300° C. to result in a yield strength of approximately 182 Mpa, with a further increase of approximately 48 Mpa during bake hardening.

Figure 16:
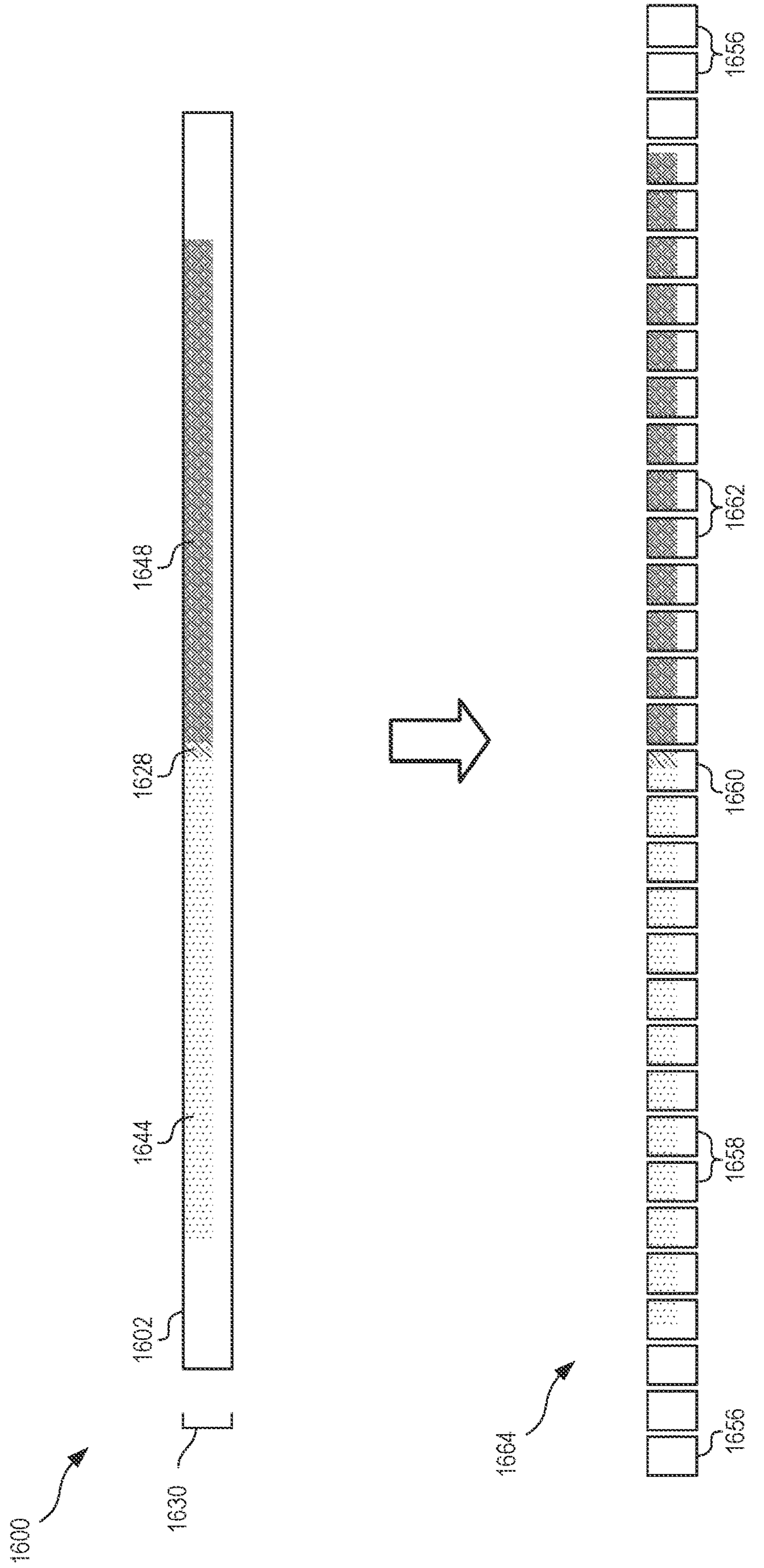
FIG. 16 is a combination diagram depicting a metal strip having a width-variable, longitudinally changing heat treatment and a set of metal blanks cut from the metal strip.

FIG. 16 is a combination diagram depicting a metal strip 1602 having a width-variable, longitudinally changing heat treatment and a set of metal blanks 1664 cut from the metal strip 1602 according to certain aspects of the present disclosure. The metal strip 1602 can have a width 1630. The width-variable, longitudinally changing heat treatment applied to the metal strip 1602 can result in the metal strip 1602 having a first region 1644 with a first temper (e.g., a high strength temper) and a second region 1648 having a second temper (e.g., a very high strength temper). A transitional region 1628 can be located between the first region 1644 and second region 1648. Additional transitional regions between the first region 1644 and untreated portion of the metal strip 1602 and the second region 1648 and untreated portion of the metal strip 1602 are not shown for clarity purposes.

The set of metal blanks 1664 can be created by cutting the metal strip 1602 in a blanking line. The set of metal blanks 1664 can include one or more fully untreated blanks 1656, one or more blanks 1658 tailored to include a combination of the first temper and untreated metal, and one or more blanks 1662 tailored to include a combination of the second temper and untreated metal. In some cases, one or more blanks 1660 can include the transitional region 1628.

Figure 17:
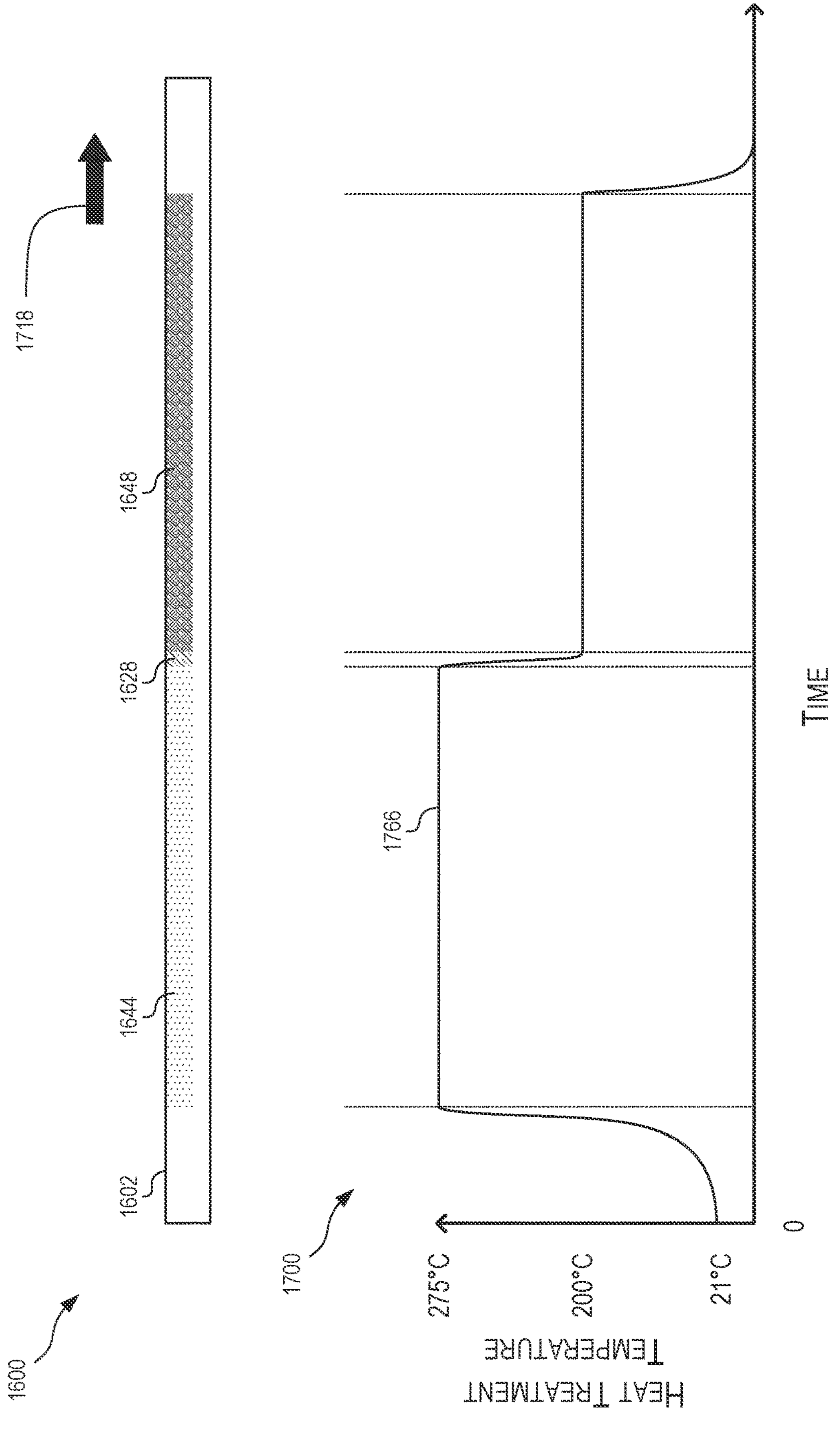
FIG. 17 is a combination diagram depicting the metal strip of FIG. 16 having a width-variable, longitudinally changing heat treatment and a plot showing the heat treatment temperature over time used to treat the metal strip.

FIG. 17 is a combination diagram depicting the metal strip 1602 of FIG. 16 having a width-variable, longitudinally changing heat treatment and a plot 1700 showing the heat treatment temperature over time used to treat the metal strip 1602 according to certain aspects of the present disclosure. The metal strip 1602 can include a first region 1644, a second region 1648, and a transitional region 1628. Dimensionally variable and longitudinally changing heat treatment can be applied as the metal strip 1602 moves in direction 1718.

Plot 1700 depicts time across the x-axis and the heat treatment temperature along the y-axis. Line 1766 depicts the change in temperature of the metal strip 1602 over time at the location of the dimensionally variable heat treatment apparatus used to heat treat the metal strip 1602. Certain example temperature values are shown in plot 1700, however other values can be used. As the metal strip 1602 moves in direction 1718, the beginning of the first region 1644 (e.g., left edge of the region as depicted in FIG. 17) can reach the dimensionally variable heat treatment apparatus used to heat treat the metal strip 1602. At that time, the heat treatment apparatus can raise the temperature of the metal strip 1602 adjacent the apparatus to a first temperature, such as approximately 275° C. After a certain amount of time, at which point the transitional region 1628 reaches the heat treatment apparatus, the heat treatment apparatus can adjust to change the temperature of the metal strip 1602 to a new temperature, such as approximately 200° C. After another duration, at which point the end of the second region 1648 reaches the heat treatment apparatus, the heat treatment apparatus can adjust to stop heating the metal strip 1602, thus allowing a final length of metal strip 1602 to be produced without any dimensionally variable heat treatment.

As depicted in FIGS. 16-17, longitudinally changing heat treatments are shown as having width-variable heat treatments that change in intensity (e.g., to temper the metal to different strength), however other types of longitudinally changing heat treatments can be used with the various dimensionally variable heat treatment apparatuses disclosed herein. For example, one or more separation planes can be moved or manipulated as a function of longitudinal distance along a metal strip. As another example, a thickness-variable heat treatment can change in intensity as a function of longitudinal distance along a metal strip. Any combination of the above longitudinally changing heat treatments can be used.

Figure 18:
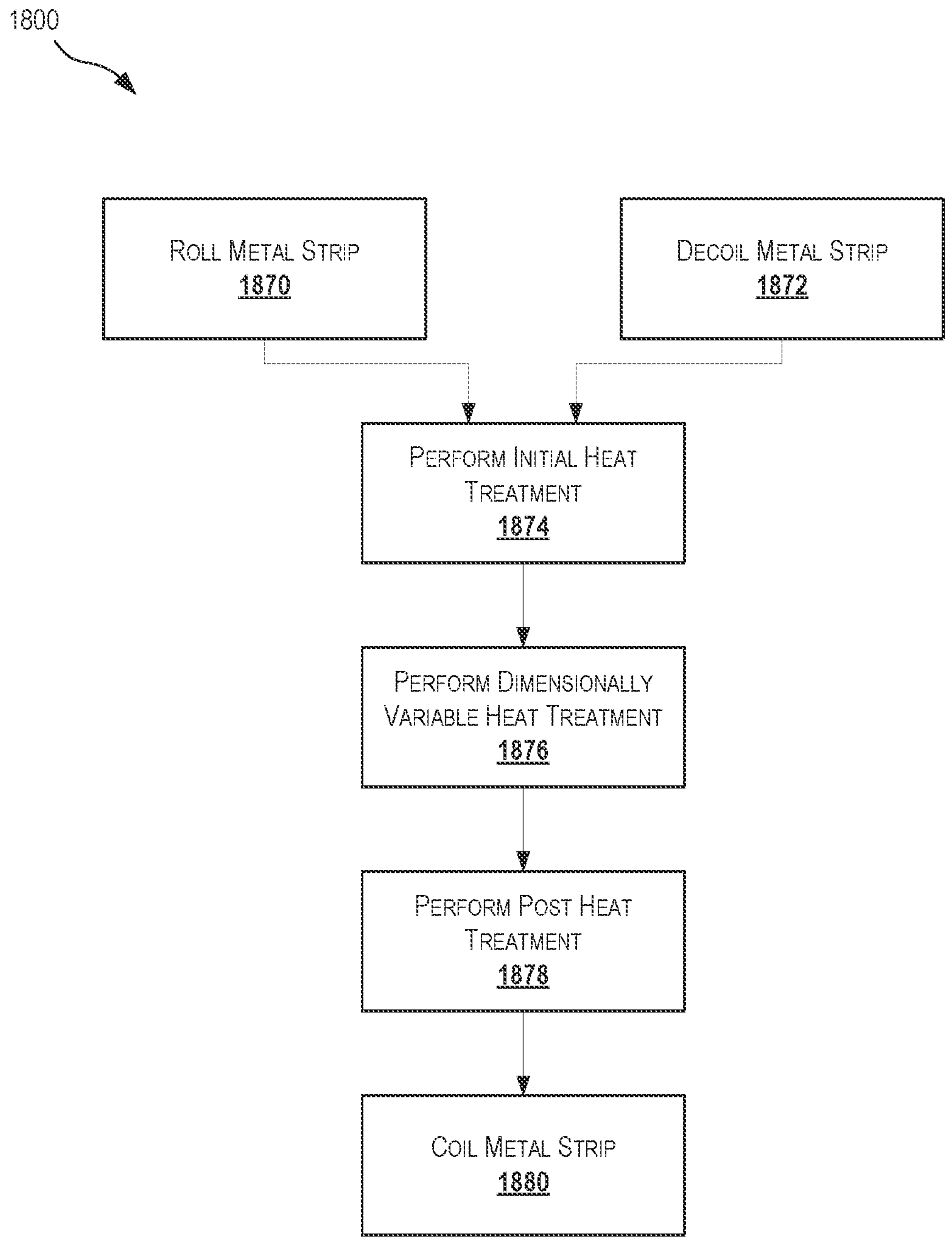
FIG. 18 is a flowchart depicting a process for processing metal strips using dimensionally variable heat treatment.

FIG. 18 is a flowchart depicting a process 1800 for processing metal strips using dimensionally variable heat treatment according to certain aspects of the present disclosure. Dimensionally variable heat treatment can be applied at block 1876. In some cases, block 1867 can be immediately followed by coiling the metal strip at block 1880, or performing another action, such as blanking the metal strip. In some cases, post heat treatment can be optionally performed at block 1878, after the dimensionally variable heat treatment is performed at block 1876. In some cases, an initial heat treatment can be optionally performed at block 1874 before the dimensionally variable heat treatment is performed at block 1876.

In some cases the dimensionally variable heat treatment performed at block 1876 can be incorporated into a cold rolling mill, where prior to heat treatment, the metal strip is rolled (e.g., cold rolled) at block 1870. In some cases, the dimensionally variable heat treatment performed at block 1876 can be incorporated into a post-rolling process, such as blanking, slitting, or even a separate heat treatment process. In some cases, prior to heat treatment, the metal strip can be decoiled at block 1872.

Figure 19:
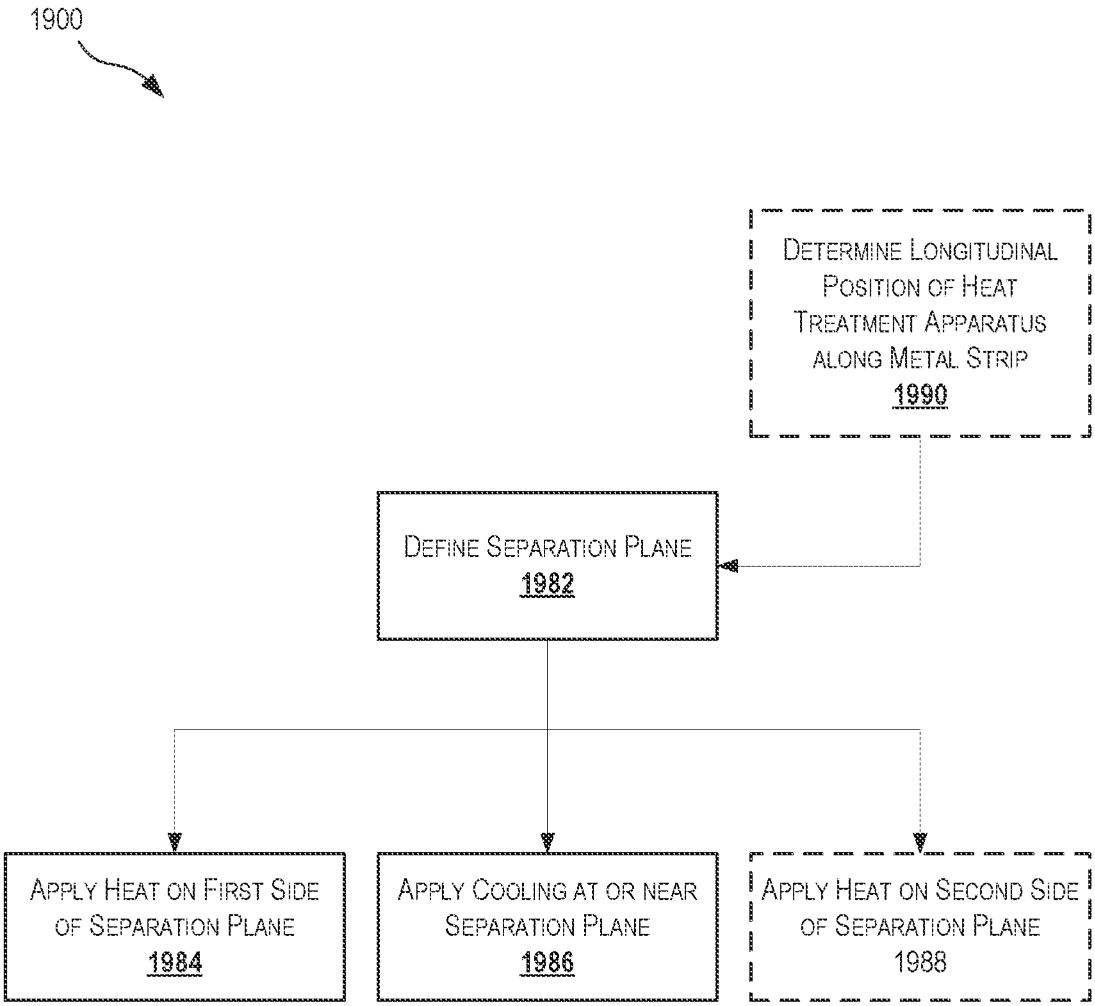
FIG. 19 is a flowchart depicting a process for applying dimensionally variable heat treatment to metal strips.

FIG. 19 is a flowchart depicting a process 1900 for applying dimensionally variable heat treatment to metal strips according to certain aspects of the present disclosure. Process 1900 can take place while the metal strip is moving, such as in a CASH line, a blanking line, or a slitting line. In some cases, process 1900 can be controlled by controller 101 from FIG. 1 or controller 1101 from FIG. 11. Other controllers can be used in other At block 1982, a separation plane can be defined. The separation plane can be defined based on static inputs (e.g., a lateral position along the width of a metal strip or vertical position along a thickness of a metal strip) or based on dynamic inputs (e.g., the lateral position of the separation plane along the width of the metal strip depends on the longitudinal distance down the metal strip, or the vertical position of the separation plane along a thickness of the metal strip depends on the longitudinal distance down the metal strip).

At block 1984, heat can be applied to a first side of the separation plane. In some cases, applying heat to the first side of the separation plane can involve positioning one or more heating units proximate the metal strip and adjacent the separation plane. In some cases, applying heat to the first side of the separation plane can involve activating one or more of a set of multiple heating units such that the one or more heating units that are activated are on the first side of the separation plane.

At block 1986, cooling can be applied at or near the separation plane. In some cases, applying cooling at or near the separation plane can involve positioning one or more cooling units proximate the metal strip and at or near the separation plane. In some cases, applying cooling at or near the separation plane can involve activating one or more of a set of multiple cooling units such that the one or more cooling units that are activated are located at or near the separation plane.

In some cases, optional block 1988 can include applying heat to a second side of the separation plane in an amount that is different from the heat applied at block 1984. Optional block 1988 can be used to generate dimensionally variable heat treatments that include adjacent regions of heat treatment having different properties, such as the metal strips 702, 802, 902, 1002 depicted in FIGS. 7-10. When optional block 1988 is not used, no additional heat may be applied to the second side of the separation plane, thus leaving the second side untreated, as described herein.

In some cases, optional block 1990 can include determining the longitudinal position of the dimensionally variable heat treatment apparatus with respect to the length of the metal strip. Determining the longitudinal position can include determining a length of metal strip that has passed based on the speed of the metal strip (e.g., as sensed by a sensor or received from a process controller) and a duration of movement of the metal strip. The longitudinal position determined at block 1990 can be provided to block 1982 in cases where defining the separation plane at block 1982 includes defining the separation plane based on dynamic inputs.

Figure 20:
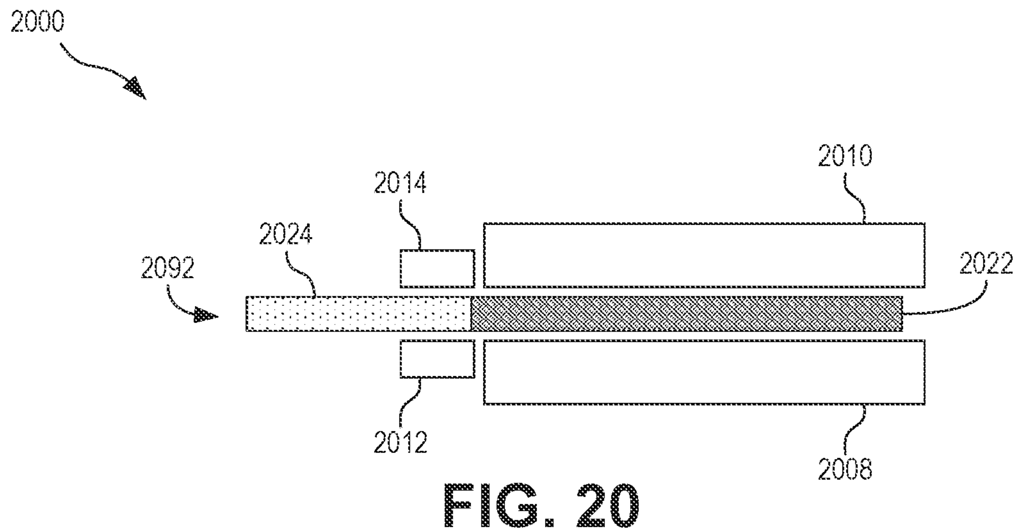
FIG. 20 is a side view of a system for dimensionally heat treating a metal blank using movable heating units according to certain aspects of the present disclosure.

FIG. 20 is a side view of a system 2200 for dimensionally heat treating a metal blank 2092 using movable heating units 2008, 2010 according to certain aspects of the present disclosure. Movable heating units 2008, 2010 can be removably positioned adjacent the metal blank 2092. In some cases, movable heating units 2008, 2010 can be positioned adjacent a metal blank 2092 that is held stationary. In other cases, a metal blank 2092 can be placed on heating unit 2008 and heating units 2010 can be placed on top of the metal blank 2092. The heating units 2008, 2010 can be placed with respect to the metal blank 2092 so that at least a portion of at least one of the top and bottom sides of the metal blank 2092 is not covered by the heating units 2008, 2010. Any suitable heating units 2008, 2010 can be used, such as those described above. In some cases, one or more of the heating units 2008, 2010 can be movable between a deployed position adjacent the metal blank 2092 and a stowed position away from the metal blank 2092.

Optionally, one or more cooling units 2012, 2014 can be placed adjacent the metal blank 2092 and adjacent a portion of the metal blank 2092 that is not covered by the heating units 2008, 2010. The cooling units 2012, 2014 can be placed adjacent one of the heating units 2008, 2010. The cooling units 2012, 2014 can help remove heat from the metal blank 2092 that has conducted through the metal blank 2092 from the portion of the metal blank 2092 that is heated by the heating units 2008, 2010. The cooling units 2012, 2014 can be any suitable cooling unit, such as those described above. In some cases, a cooling unit can be coupled to a heating unit to be held stationary with respect to the heating unit.

The heating units 2008, 2010 can heat the metal blank 2092 to a temperature suitable for heat treatment. The ambient temperature around the portion of the metal blank 2092 not directly heated by the heating units 2008, 2010, as well as any optional cooling units 2012, 2014, can remove heat from the metal blank 2092 such that a portion 2024 of the metal blank 2092 that is not directly heated by the heating units 2008, 2010 remains untreated from the heat of the furnace 2094. The result can be a metal blank 2092 with dimensionally variable heat treatment.

Figure 21:
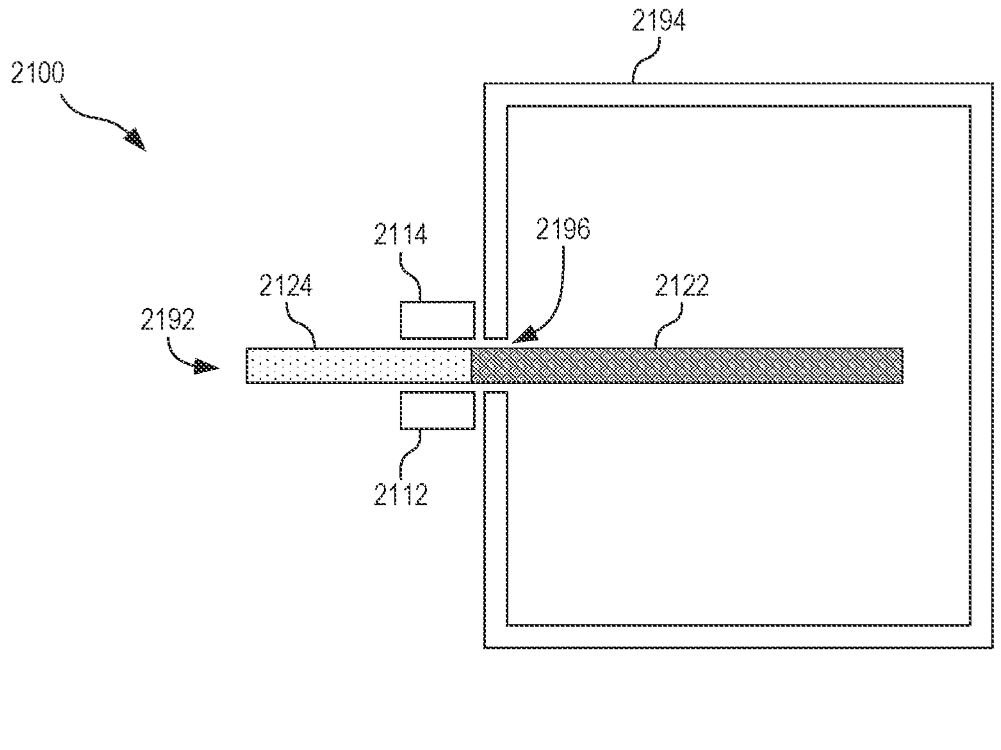
FIG. 21 is a side view of a system for dimensionally heat treating a metal blank using a furnace according to certain aspects of the present disclosure.

FIG. 21 is a side view of a system 2100 for dimensionally heat treating a metal blank 2192 using a furnace 2194 according to certain aspects of the present disclosure. A metal blank 2192 can be a piece of metal in a defined shape, such as a rectangular piece of metal that has been cut from a continuous metal strip. The metal blank 2192 can be located partially within a furnace 2194 such that at least a portion of the metal blank 2192 remains outside of the furnace 2194. The furnace 2194 can be any suitable furnace with any suitable heating source, such as heating units described above and circulating hot air. The furnace 2194 can include an entrance 2196 that is shaped to accept the metal blank 2192. For example, the entrance 2196 can be a slot that is slightly larger than a cross section of the metal blank 2192, thus allowing the metal blank 2192 to be inserted in and removed from the furnace 2194 without allowing too much heat to escape through the entrance 2196 when in use.

Optionally, one or more cooling units 2112, 2114 can be placed adjacent the metal blank 2192 and outside of the furnace 2194. The cooling units 2112, 2114 can be placed adjacent an entrance 2196 to the furnace 2194. The cooling units 2112, 2114 can help remove heat from the metal blank 2192 that has conducted through the metal blank 2192 from the portion of the metal blank 2192 that lies within the furnace 2194. The cooling units 2112, 2114 can be any suitable cooling unit, such as those described above.

The furnace 2194 can be heated to a temperature sufficient to heat treat a portion 2122 of the metal blank 2192. The ambient temperature outside of the furnace 2194 and any optional cooling units 2112, 2114 can remove heat from the metal blank 2192 such that a portion 2124 of the metal blank 2192 located outside of the furnace 2194 remains untreated from the heat of the furnace 2194. The result can be a metal blank 2192 with dimensionally variable heat treatment.

Figure 22:
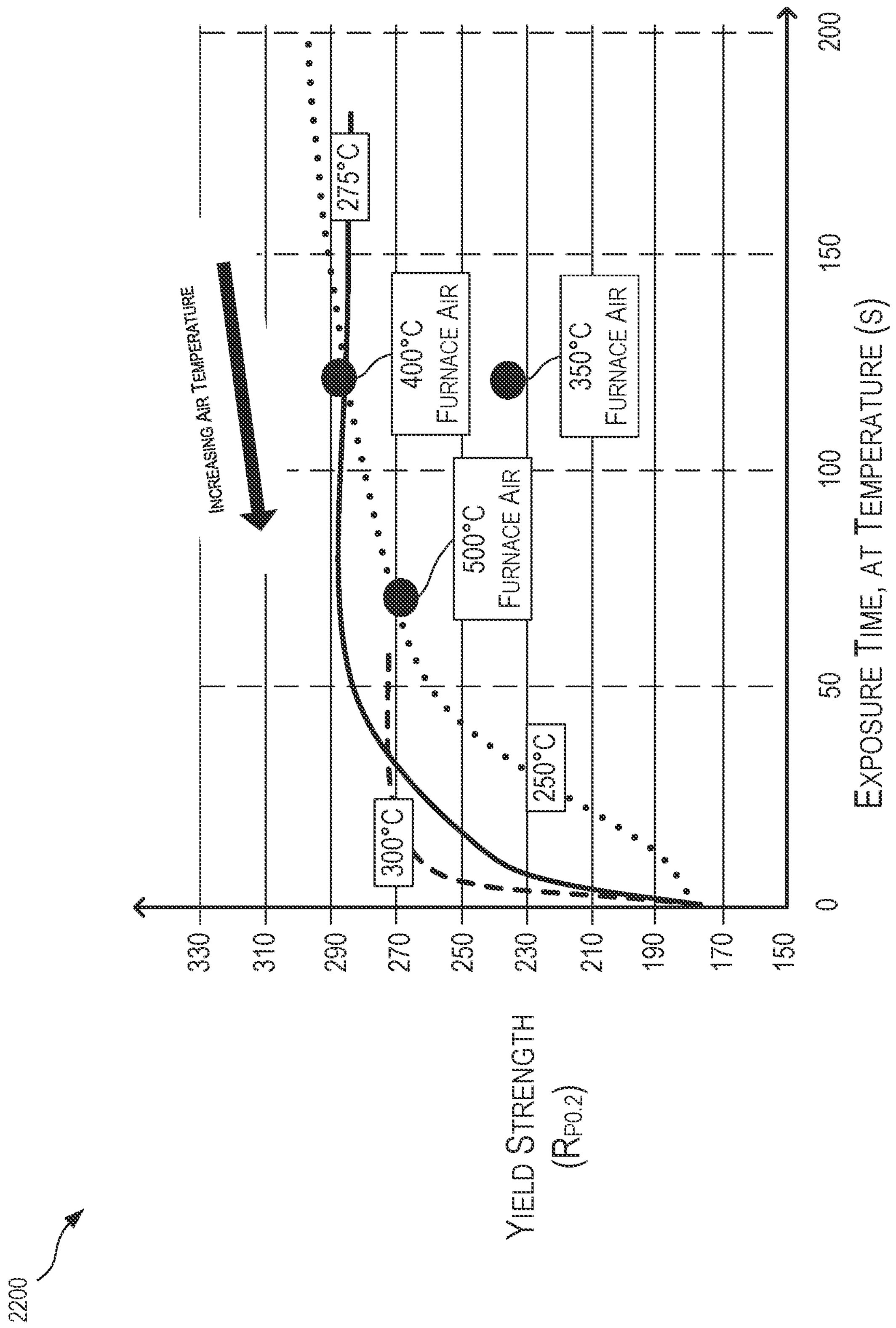
FIG. 22 is a plot depicting the relationship between yield strength and the exposure time at temperature for an example aluminum alloy for several heat treatment temperatures using the systems of FIGS. 20 and 21, according to certain aspects of the present disclosure.

FIG. 22 is a plot 2200 depicting the relationship between yield strength (e.g., 0.2% offset yield strength) and the exposure time at temperature for an example aluminum alloy for several heat treatment temperatures using the systems of FIGS. 20 and 21, according to certain aspects of the present disclosure. The plot 2200 depicts dimensionally variable heat treatment for 8931 aluminum alloy. The plotted lines depict trials using a system with movable heating units similar to the system 2000 of FIG. 20, wherein the heating units are heated to 250° C., 275° C. or 300° C. and the metal blank is heated for various durations between 0 to 200 seconds. The individual points depict trials using a furnace system similar to system 2100 of FIG. 21, wherein the furnace air is heated to 350° C., 400° C., and 500° C. and the metal blank is heated within the furnace for durations of approximately 70 seconds or 120 seconds.

As shown in plot 2200, high strengths can be achieved by rapidly heating the metal blank using various systems and maintaining the heat for a relatively small amount of time (e.g., less than an hour, less than 10 minutes, less than 200 seconds, less than 150 seconds, less than 100 seconds, and less than a minute). Similar results can be obtained by continuously heat treating metal strips as described above.

Figure 23:
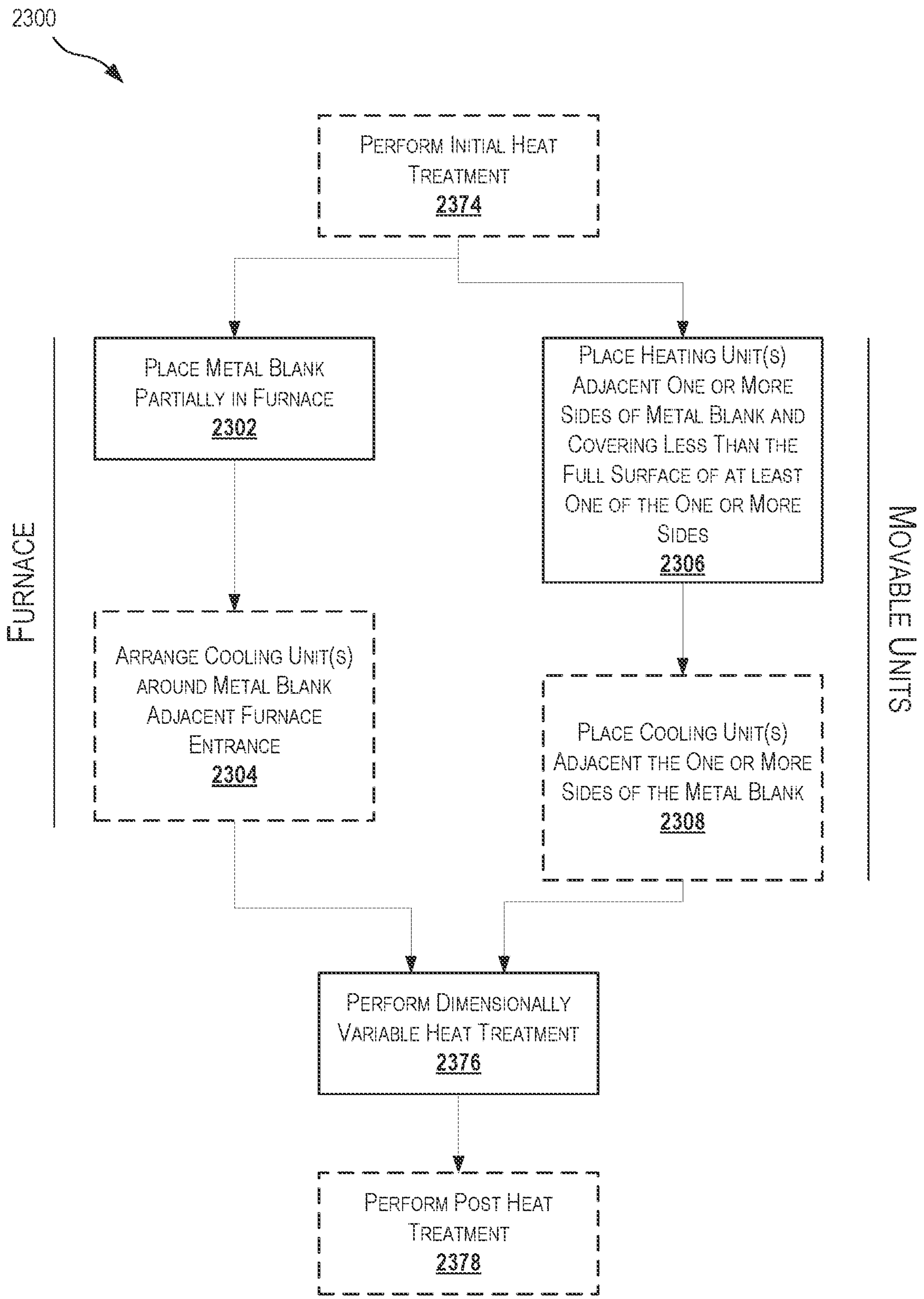
FIG. 23 is a flowchart depicting a process for dimensionally heat treating metal blanks according to certain aspects of the present disclosure.

FIG. 23 is a flowchart depicting a process 2300 for dimensionally heat treating metal blanks according to certain aspects of the present disclosure. The process 2300 includes performing dimensionally variable heat treatment at block 2310 using either a system with movable heating and/or cooling units, such as system 2100 of FIG. 21, or furnace system, such as system 2100 of FIG. 21. At optional block 2374, the metal blank is initially heat treated. In some cases, initial heat treatment can occur before or after a blanking process (e.g., creating metal blanks from a continuous metal strip).

When a furnace system is used, blocks 2302 and optionally 2304 may be performed. At block 2302, a metal blank is placed partially in a furnace. The metal blank can be automatically or manually positioned in the furnace. Any suitable furnace can be used. The metal blank can be placed in a furnace such that at least portion remains outside of the furnace. At optional block 2304, one or more cooling units can be arranged around the metal block and outside of the furnace. The cooling units can be arranged adjacent the furnace entrance to help in defining a separation plane in the metal blank. In some cases, cooling units can be coupled to the furnace. In some cases, cooling units coupled to the furnace can be permanently located adjacent the furnace entrance, however in some cases cooling units coupled to a furnace can be movable between a deployed position adjacent a metal blank partially inserted in the furnace and a stowed position located away from a metal blank partially inserted in the furnace.

When a system with movable heating and/or cooling units is used, blocks 2306 and optionally 2308 may be performed. At block 2306, one or more heating units are placed adjacent one or more sides of a metal blank, such as adjacent a top and/or bottom side of the metal blank. The heating unit(s) can be positioned such that at least a portion of one or more of the top and bottom sides of the metal blank is left uncovered by the heating unit(s). In some cases, at least one of the heating units can be positioned on a structure and pivotable about an axis to move between a deployed position adjacent a metal blank and a stowed position away from a metal blank. When in the stowed position, the heating unit can be out of the way to facilitate loading and unloading of the metal blank. In some cases, any of the heating units can be positionable about a metal blank that is held stationary. At optional block 2308, one or more cooling units can be placed adjacent the one or more sides of the metal blank. The cooling units can be placed on portions of the metal blank that are not covered by the heating units. The cooling units can be placed adjacent a heating unit or opposite the metal blank from the heating unit. In some cases, the cooling units can be coupled to the heating units and held stationary with respect to the heating units. For example, a cooling unit attached to a heating unit that is movable between deployed and stowed positions can also move between deployed and stowed positions.

At block 2376, the metal blank can be heat treated through dimensionally variable heat treatment. The metal blank can be heated (e.g., by the furnace or heating units) so that only a portion of the metal blank is heat treated. In some cases, dimensionally variable heat treatment can include using the cooling unit(s) to extract heat from the metal blank to ensure a desired portion of the metal blank remains untreated. At optional block 2378, additional heat treatment can be performed on the tailored metal blank.

Figure 24:
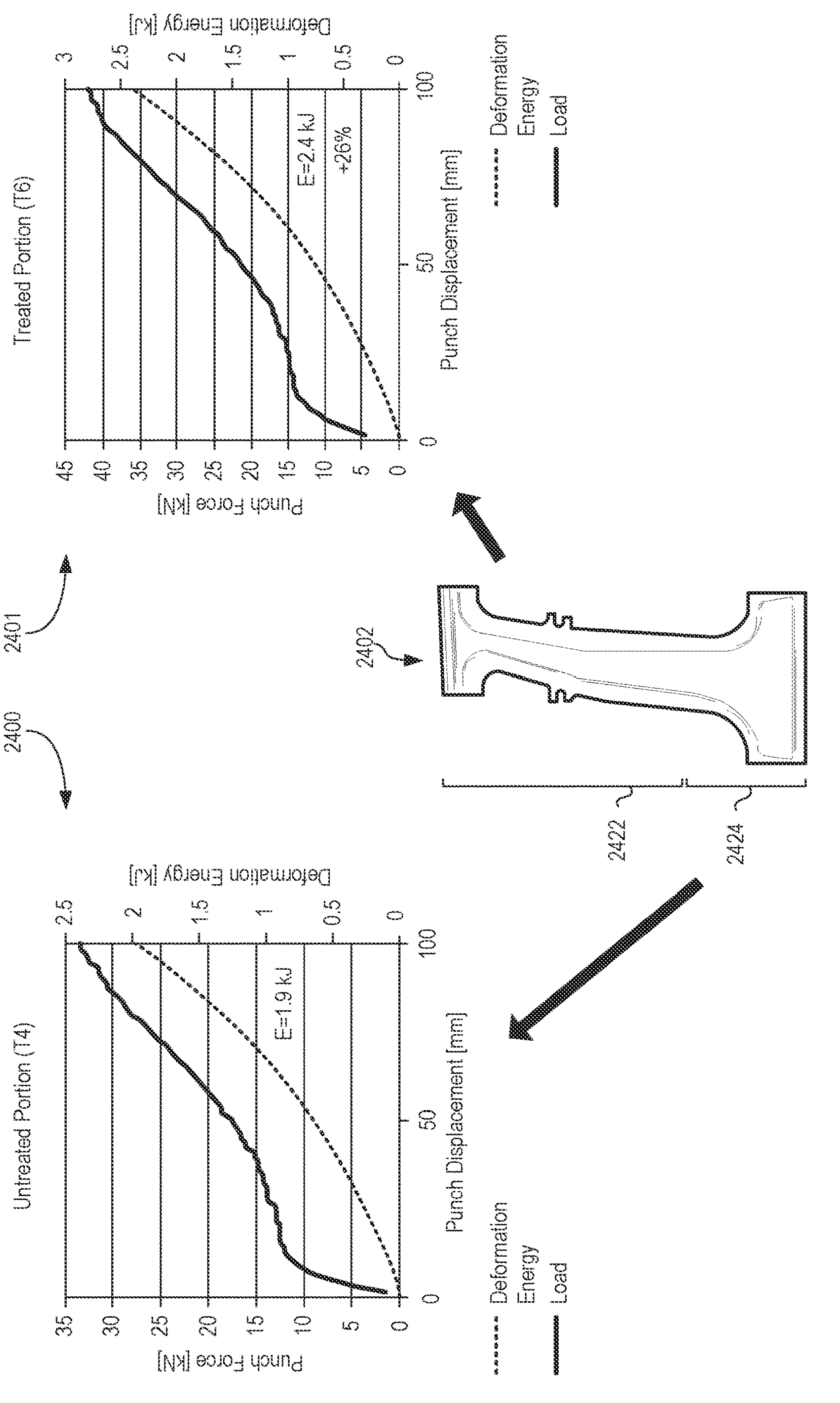
FIG. 24 is a set of plots depicting punch force and punch displacement of a dimensionally variable heat treated part according to certain aspects of the present disclosure.

FIG. 24 is a set of plots 2400, 2401 depicting punch force and punch displacement of a dimensionally variable heat treated part 2402 according to certain aspects of the present disclosure. Plot 2400 depicts punch force and punch displacement of a treated portion 2422 of the dimensionally variable heat treated part 2402. Plot 2401 depicts punch force and punch displacement of an untreated portion 2422 of the dimensionally variable heat treated part 2402. The punch testing can be performed on the punch test apparatus 3200 of FIG. 32 or any other suitable punch test apparatus. The dimensionally variable heat treated part can be made from 8967 aluminum alloy and treated in a system with a furnace similar to the system 2100 of FIG. 21 wherein the furnace is held at 500° C. and the part 2402 is treated for 90 seconds. No additional heat treatment is performed after the dimensionally variable heat treatment. As seen in the plots 2400, 2401, the amount of energy necessary to achieve 100 mm of punch displacement is approximately 2.1 kJ for the untreated portion 2424 and 2.3 kJ for the treated portion 2422. Thus, the treated portion 2422 shows a 9% improvement for the amount of deformation energy needed to achieve the same amount of deformation. Thus, the part is able to be tailored to have an untreated portion that is formable, while having a treated portion that is designed to absorb more energy in crash situations.

Figure 25:
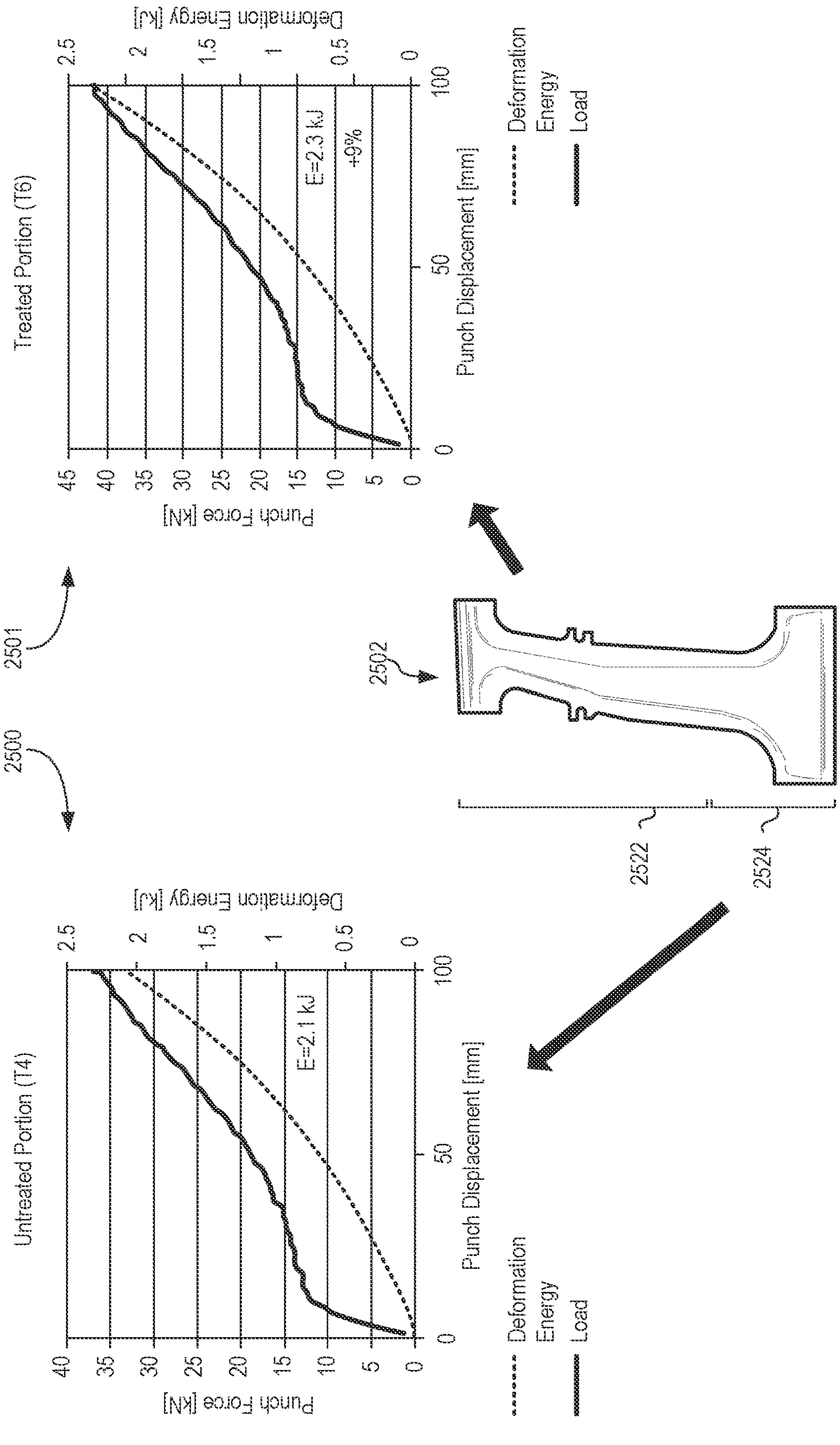
FIG. 25 is a set of plots depicting punch force and punch displacement of a dimensionally variable heat treated part according to certain aspects of the present disclosure.

FIG. 25 is a set of plots 2500, 2501 depicting punch force and punch displacement of a dimensionally variable heat treated part 2502 according to certain aspects of the present disclosure. Plot 2500 depicts punch force and punch displacement of a treated portion 2522 of the dimensionally variable heat treated part 2502. Plot 2501 depicts punch force and punch displacement of an untreated portion 2522 of the dimensionally variable heat treated part 2502. The punch testing can be performed on the punch test apparatus 3200 of FIG. 32 or any other suitable punch test apparatus. The dimensionally variable heat treated part can be made from 8967 aluminum alloy and treated in a system with a furnace similar to the system 2100 of FIG. 21 wherein the furnace is held at 500° C. and the part 2502 is treated for 90 seconds. Additional heat treatment at 175° C. for 15 minutes can be performed on the entire part after the dimensionally variable heat treatment. This additional heat treatment can be performed on the entire part, including both the treated portion 2522 and the untreated portion 2524. As seen in the plots 2500, 2501, the amount of energy necessary to achieve 100 mm of punch displacement is approximately 2.1 kJ for the untreated portion 2524 and 2.3 kJ for the treated portion 2522. Thus, the treated portion 2522 shows a 9% improvement for the amount of deformation energy needed to achieve the same amount of deformation.

Figure 27:
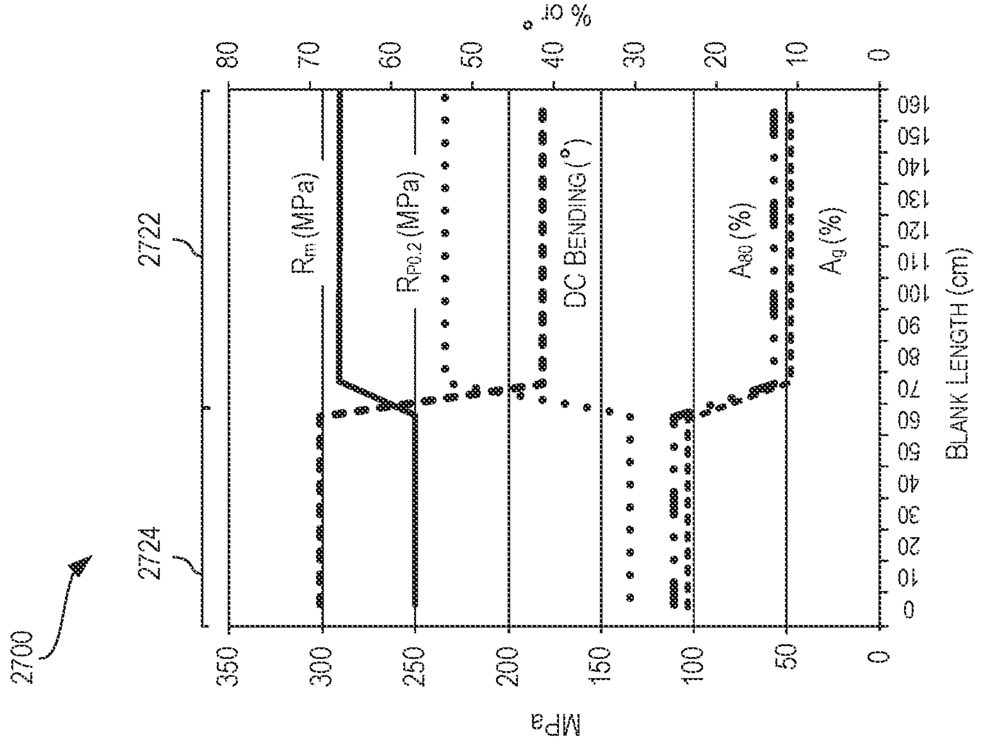
FIG. 27 is a plot depicting various mechanical properties and semi-crash behavior for a dimensionally variable heat treated aluminum part treated in a furnace at 650° C. according to certain aspects of the present disclosure.
Figure 26:
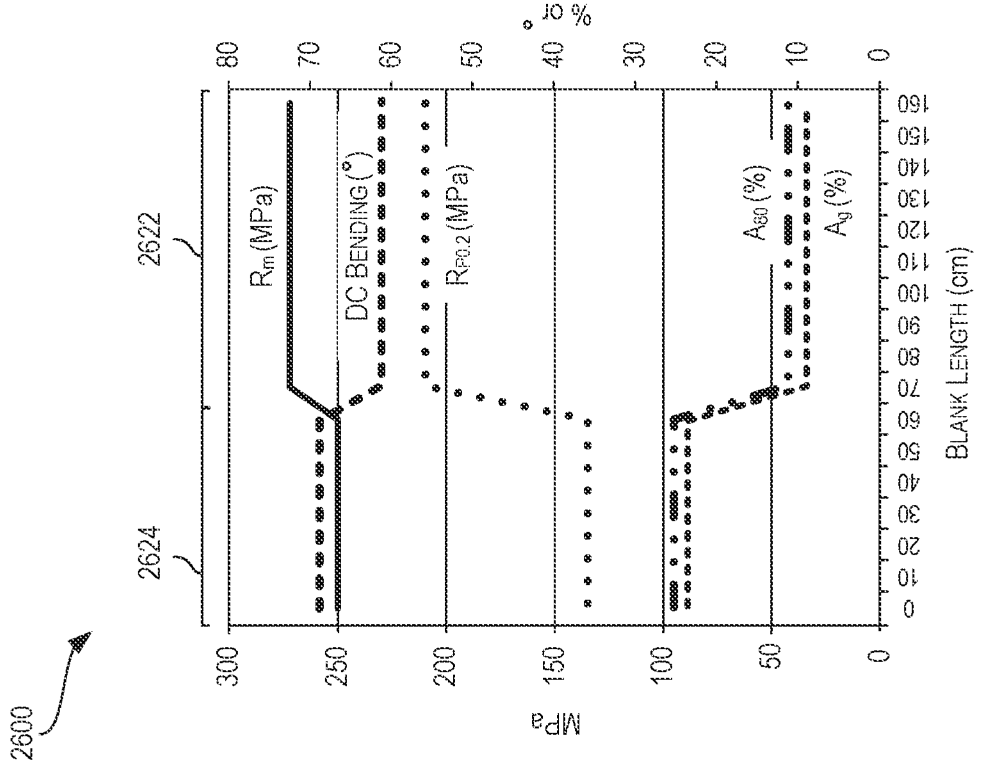
FIG. 26 is a plot depicting various mechanical properties and semi-crash behavior for a dimensionally variable heat treated aluminum part treated in a furnace at 600° C. according to certain aspects of the present disclosure.
Figure 28:
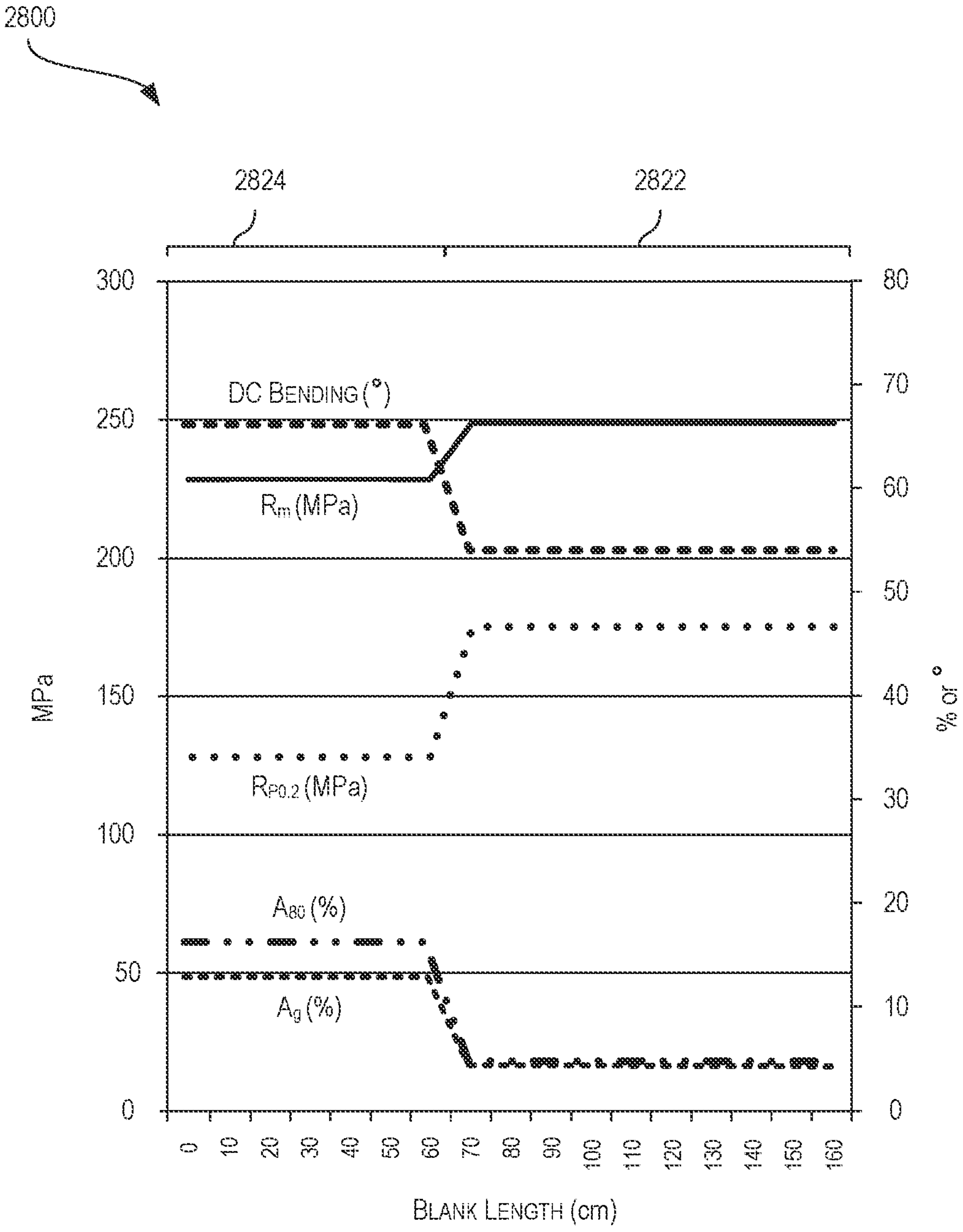
FIG. 28 is a plot depicting various mechanical properties and full crash behavior for a dimensionally variable heat treated aluminum part treated in a furnace at 650° C. according to certain aspects of the present disclosure.

FIGS. 26-28 are plots 2600, 2700, 2800 depicting various mechanical properties and semi-crash or full crash behavior for different dimensionally variable heat treated aluminum parts. The lines marked A80 can represent the percent elongation (at fracture) indexed to an original gauge length of 80 mm. The lines marked Ag can represent the percent of non-proportional elongation at maximum force. The lines marked RP0.2 can represent the 0.2% offset yield strength, also known as 0.2% proof stress. The lines marked Rm can represent tensile strength. The lines marked DC Bending can represent the angle to which the material is bent without force drop during a 3-point bending test.

FIG. 26 is a plot 2600 depicting various mechanical properties and semi-crash behavior for a dimensionally variable heat treated aluminum part treated in a furnace at 600° C. according to certain aspects of the present disclosure. The part is 6111 aluminum alloy treated in a furnace system, such as system 2100 of FIG. 2100 that is heated to 600° C. A 2.0 mm thick metal blank is inserted approximately 100 cm into a furnace heated to 600° C. and allowed to remain for 60 seconds. Cooling units may or may not be used. The metal blank is removed and prepared for testing. The plot 2600 shows the different mechanical properties present in the untreated portion 2624 and treated portion 2622 of a single metal blank or single part made from the metal blank.

FIG. 27 is a plot 2700 depicting various mechanical properties and semi-crash behavior for a dimensionally variable heat treated aluminum part treated in a furnace at 650° C. according to certain aspects of the present disclosure. The part is 6111 aluminum alloy treated in a furnace system, such as system 2100 of FIG. 2100 that is heated to 650° C. A 2.0 mm thick metal blank is inserted approximately 100 cm into a furnace heated to 650° C. and allowed to remain for 60 seconds. Cooling units may or may not be used. The metal blank is removed and prepared for testing. The plot 2700 shows the different mechanical properties present in the untreated portion 2724 and treated portion 2722 of a single metal blank or single part made from the metal blank.

Example parts made from 6111 aluminum alloy dimensionally variably heat treated at 650° C. as described with reference to FIG. 27 result in an average of 2.2 kJ required for 140 mm displacement in a bending test for the untreated region 2724 and an average of 2.7 kJ for the treated region 2722. The treated region 2722 shows a 23% increase in the energy necessary to achieve the same amount of displacement in the bending test as compared to the untreated region 2724.

FIG. 28 is a plot 2800 depicting various mechanical properties and full crash behavior for a dimensionally variable heat treated aluminum part treated in a furnace at 650° C. according to certain aspects of the present disclosure. The part is 6451 aluminum alloy treated in a furnace system, such as system 2100 of FIG. 2100 that is heated to 650° C. A 2.0 mm thick metal blank is inserted approximately 100 cm into a furnace heated to 650° C. and allowed to remain for 60 seconds. Cooling units may or may not be used. The metal blank is removed and prepared for testing. The plot 2800 shows the different mechanical properties present in the untreated portion 2824 and treated portion 2822 of a single metal blank or single part made from the metal blank.

Example parts made from 6451 aluminum alloy dimensionally variably heat treated at 650° C. as described with reference to FIG. 28 result in an average of 3.6 kJ required for approximately 185 mm displacement in a bending test for the untreated region 2824 and an average of 4.4 kJ for the treated region 2822. The treated region 2822 shows a 22% increase in the energy necessary to achieve the same amount of displacement in the bending test as compared to the untreated region 2824.

Figure 29:
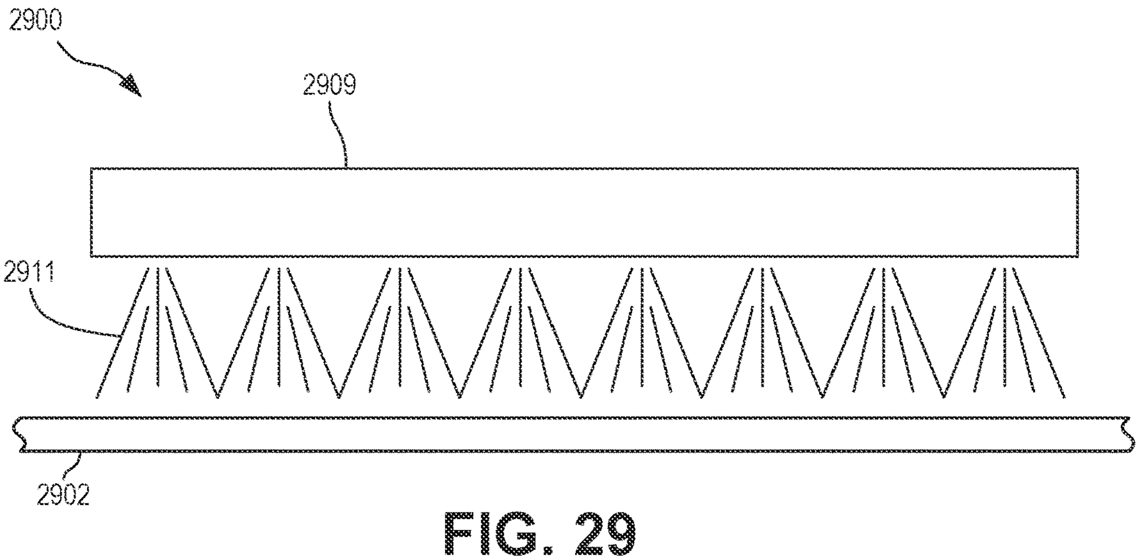
FIG. 29 is a side view of a fluid temperature control unit according to certain aspects of the present disclosure.

FIG. 29 is a side view of a fluid temperature control unit 2900 according to certain aspects of the present disclosure. The fluid temperature control unit 2900 can be a cooling unit (e.g., cooling unit 114 of FIG. 1) or a heating unit (e.g., heating unit 110 of FIG. 1) depending on the temperature of the fluid dispersed. The fluid temperature control unit 2900 can including a header 2909 with one or more nozzles for producing one or more sprays 2911 of fluid directed towards a surface of the metal strip 2902 or metal blank. Suitable fluids can include air, water, or oil, or other fluids.

In some cases, multiple nozzles of a single header 2909 can be individually controlled to provide heated fluid or cooled fluid. Therefore, a single header 2909 can simultaneously perform as a cooling unit and a heating unit by dispersing heated fluid out of a first set of nozzles and cooled fluid out of a second set of nozzles. Such an arrangement can define a separation plane between each set of nozzles.

Figure 30:
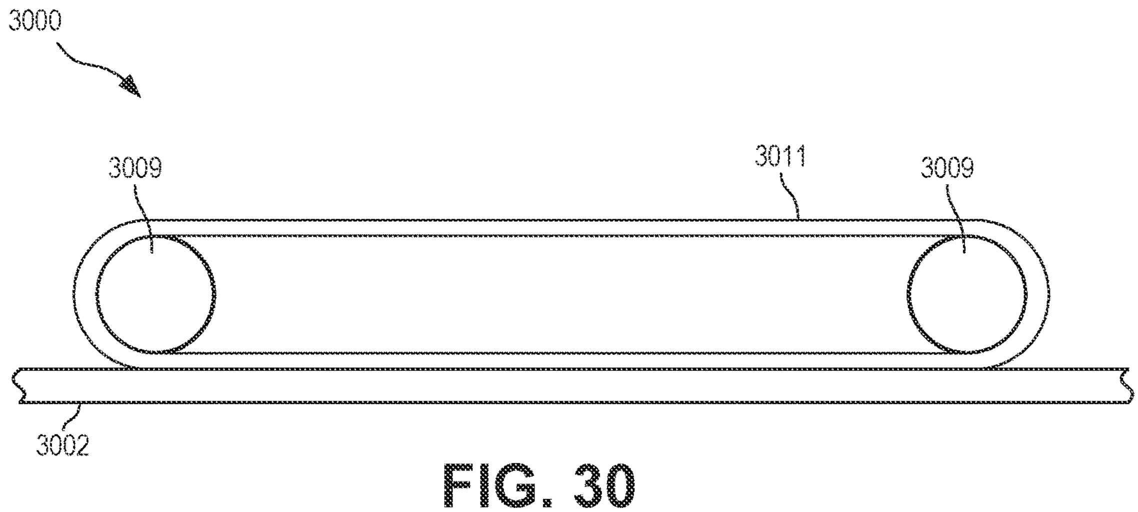
FIG. 30 is a side view of a moving band temperature control unit according to certain aspects of the present disclosure.

FIG. 30 is a side view of a moving band temperature control unit 3000 according to certain aspects of the present disclosure. The moving band temperature control unit 3000 can include a moving band 3011 that moves in a closed loop around one or more rotors 3009. The moving band 3011 can contact a moving metal strip 3002 and either remove heat from or introduce heat into the metal strip 3002. The moving band 3011 can be actively powered to move in the closed loop by the rotors 3009 (e.g., by a motor coupled to the rotor). In some cases, however, the moving band 3011 can be passive, moving in the closed loop through friction between the band 3011 and the metal strip 3002.

The moving band temperature control unit 3000 can be a cooling unit (e.g., cooling unit 114 of FIG. 1) or a heating unit (e.g., heating unit 110 of FIG. 1) depending on whether heat is removed from or introduced to the band 3011, respectively. Heat can be removed from or introduced to the band by any suitable mechanism, such as a heating or cooling unit positioned opposite the moving band temperature control unit 3000 from the metal strip 3002. In some cases, heat can be removed from or introduced to the band through a heated or cooled rotor 3009 (e.g., with internal heating or internal cooling). The moving band 3011 can be made from any suitable material, such as a material with high heat conductivity.

Figure 31:
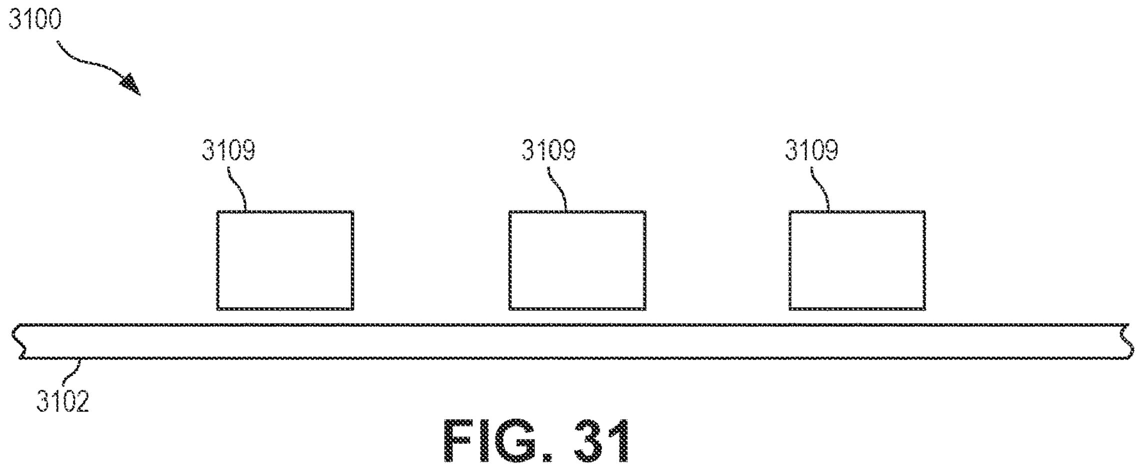
FIG. 31 is a side view of an induction heating unit according to certain aspects of the present disclosure.

FIG. 31 is a side view of an induction heating unit 3100 according to certain aspects of the present disclosure. The induction heating unit 3100 can include one or more induction devices 3109 coupled to suitable drivers for generating magnetic fields around the induction devices 3109. The induction devices 3109 can generate heat in an adjacent metal strip 3102 or metal blank.

Figure 32:
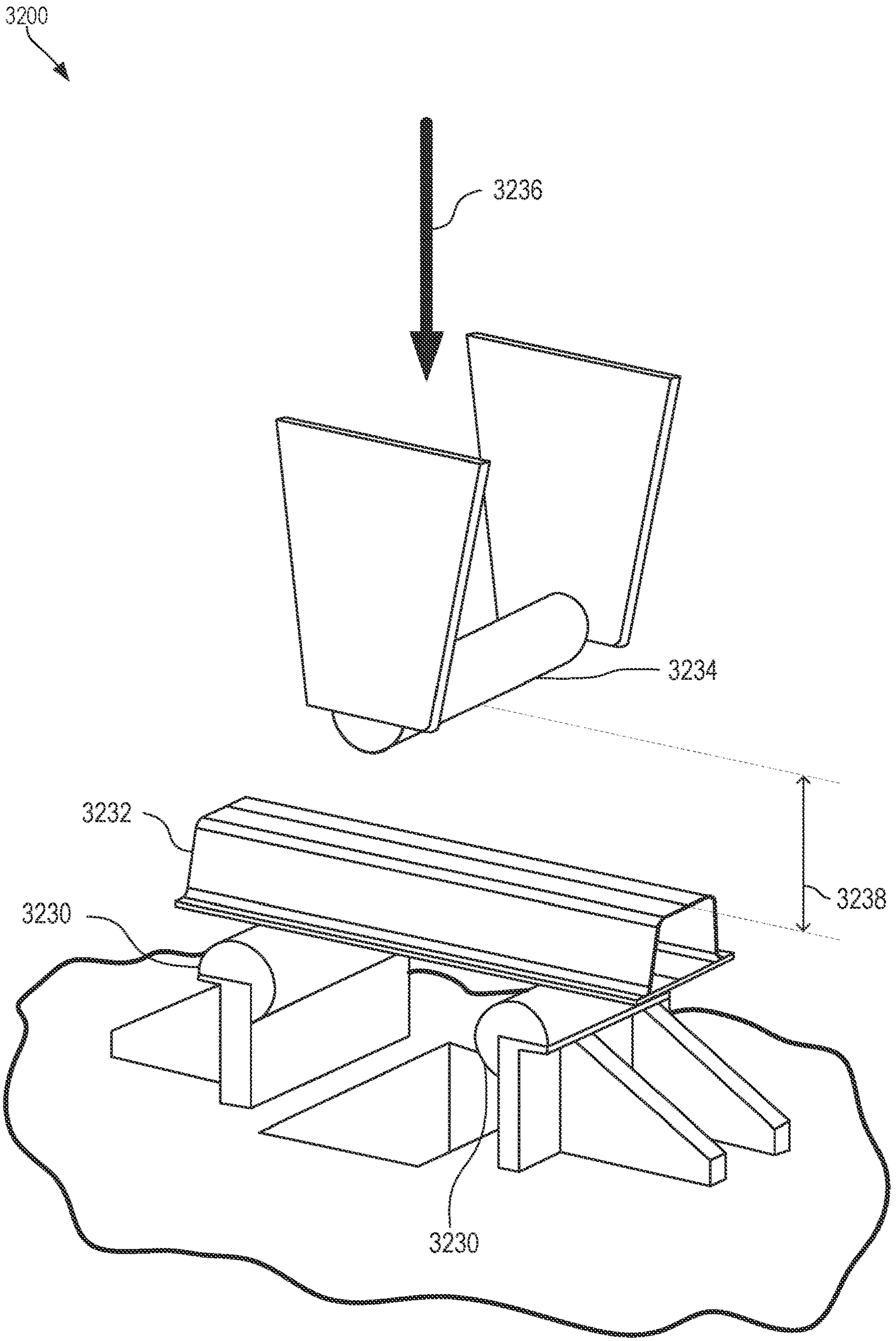
FIG. 32 is a schematic diagram of a punch test apparatus for testing dimensionally variable heat treated parts according to certain aspects of the present disclosure.

FIG. 32 is a schematic diagram of a punch test apparatus 3200 for testing metal parts 3232 according to certain aspects of the present disclosure. A metal part 3232, such as a dimensionally variable heat treated part or a portion of a dimensionally variable heat treated part, can be supported by a pair of supports 3230. A punch 3234 can be pressed against the metal part 3232 at a location between the pair of supports 3230 and opposite the metal part 3232 from the pair of supports 3230. The punch 3234 can be pressed against the metal part 3232 with force 3236, which can be measured using suitable force measurement equipment. The displacement 3238 of the punch 3234 with respect to the metal part 3232 can be measured using suitable force measurement equipment. As depicted in FIG. 32, the displacement 3238 can be negative until the punch 3234 begins to make contact with metal part 3232, and can grow in magnitude as the punch 3234 begins displacing the metal part 3232. The punch test apparatus 3200 or a similar apparatus can be used to chart curves of punch displacement with respect to punch force (e.g., load), such as those depicted in and described with respect to FIGS. 24 and 25.

The foregoing description of the embodiments, including illustrated embodiments, has been presented only for the purpose of illustration and description and is not intended to be exhaustive or limiting to the precise forms disclosed. Numerous modifications, adaptations, and uses thereof will be apparent to those skilled in the art.

As used below, any reference to a series of examples is to be understood as a reference to each of those examples disjunctively (e.g., “Examples 1-4” is to be understood as “Examples 1, 2, 3, or 4”).

Example 1 is a metal processing system, comprising a dimensionally variable heat treatment apparatus having an opening for accepting a metal strip moving at a strip rate in a movement direction. The heat treatment apparatus includes a heating unit positionable proximate the metal strip on a first side of a separation plane intersecting the metal strip to raise a strip temperature of a first portion of the metal strip on the first side of the separation plane at or above a heat treatment temperature; and a cooling unit positionable proximate the metal strip on a second side of the separation plane to maintain a second portion of the metal strip on the second side of the separation plane below the heat treatment temperature.

Example 2 is the system of example 1, wherein the separation plane is parallel the metal strip, wherein the heating unit extends across a width of the metal strip proximate the first side of the separation plane, and wherein the cooling unit extends across the width of the metal strip proximate the second side of the separation plane.

Example 3 is the system of example 1, wherein the separation plane is parallel a longitudinal axis of the metal strip and perpendicular a top surface of the metal strip, wherein the heat treatment apparatus further includes an additional heating unit positionable proximate the metal strip on the first side of the separation plane and opposite the metal strip from the heating unit; and an additional cooling unit positionable proximate the metal strip on the second side of the separation plane and opposite the metal strip from the cooling unit.

Example 4 is the system of examples 1-3, wherein the heating unit has sufficient heat generation power and has a sufficient length to maintain the strip temperature of the metal strip at or above the heat treatment temperature moving at the strip rate for a sufficient duration for tempering the metal strip.

Example 5 is the system of examples 1, 3, or 4, further comprising a linear actuator coupled to the dimensionally variable heat treatment apparatus to laterally adjust the heating unit and cooling unit with respect to the metal strip to move the separation plane with respect to the metal strip.

Example 6 is the system of example 5, further comprising a controller coupled to the linear actuator to laterally adjust the heating unit and the cooling unit as a function of longitudinal distance along the metal strip.

Example 7 is the system of examples 1-6, further comprising an additional dimensionally variable heat treatment apparatus having an additional heating unit and an additional cooling unit positioned proximate the metal strip on opposite sides of an additional separation plane, wherein the additional dimensionally variable heat treatment apparatus is spaced apart from the dimensionally variable heat treatment apparatus, and wherein the additional separation plane is not coplanar with the separation plane.

Example 8 is the system of examples 1-7, wherein the separation plane is not parallel a lateral cross section of the metal strip.

Example 9 is a method for variably heat treating a metal strip across a dimension of the metal strip, the method comprising: passing a moving metal strip through a dimensionally variable heat treatment apparatus having a heating unit and a cooling unit positioned on opposite sides of a separation plane; heating a first portion of the moving metal strip by the heating unit, wherein heating the first portion includes raising a strip temperature of the first portion of the moving metal strip at or above a heat treatment temperature for a duration; and cooling the moving metal strip by the cooling unit, wherein cooling the moving metal strip includes removing heat from the moving metal strip adjacent the first portion sufficiently to maintain a temperature of a second portion of the moving metal strip below the heat treatment temperature, wherein the second portion of the metal strip is located opposite the separation plane from the first portion.

Example 10 is the method of example 9, further comprising cooling the first portion of the moving metal strip after heating the first portion of the moving metal strip for the duration.

Example 11 is the method of examples 9 or 10, further comprising laterally adjusting the dimensionally variable heat treatment apparatus to move the separation plane with respect to the moving metal strip.

Example 12 is the method of example 11, further comprising determining a longitudinal position of the dimensionally variable heat treatment apparatus along the moving metal strip, wherein laterally adjusting the dimensionally variable heat treatment apparatus includes using the longitudinal position to move the separation plane with respect to the moving metal strip as a function of the longitudinal position.

Example 13 is the method of examples 9 or 10, wherein the separation plane is parallel the moving metal strip, wherein heating the first portion of the moving metal strip includes heating one of a top and a bottom of the moving metal strip, and wherein cooling the moving metal strip includes removing heat from another of the top and the bottom of the moving metal strip.

Example 14 is the method of examples 9-12, wherein the separation plane is parallel a longitudinal axis of the moving metal strip and perpendicular a top surface of the moving metal strip, wherein the dimensionally variable heat treatment apparatus further includes an additional heating unit and an additional cooling unit each positioned on opposite sides of the separation plane and both positioned opposite the moving metal strip from the heating unit and the cooling unit, wherein heating the first portion of the moving metal strip includes heating the top surface and a bottom surface of the moving metal strip proximate the first portion, and wherein cooling the moving metal strip includes cooling the top surface and the bottom surface of the moving metal strip proximate the second portion.

Example 15 is a metal product having dimensionally variable heat treatment prepared by a method comprising: passing a moving metal strip through a dimensionally variable heat treatment apparatus having a heating unit and a cooling unit positioned on opposite sides of a separation plane; heating a first portion of the moving metal strip by the heating unit, wherein heating the first portion includes raising a strip temperature of the first portion of the moving metal strip at or above a heat treatment temperature for a duration; and cooling the moving metal strip by the cooling unit, wherein cooling the moving metal strip includes removing heat from the moving metal strip adjacent the first portion sufficiently to maintain a temperature of a second portion of the moving metal strip below the heat treatment temperature, wherein the second portion of the moving metal strip is located opposite the separation plane from the first portion.

Example 16 is the product claim 15, wherein the method further comprises cooling the first portion of the moving metal strip after heating the first portion of the moving metal strip for the duration.

Example 17 is the product of examples 15 or 16, wherein the method further comprises laterally adjusting the dimensionally variable heat treatment apparatus to move the separation plane with respect to the moving metal strip.

Example 18 is the product of example 17, wherein the method further comprises determining a longitudinal position of the dimensionally variable heat treatment apparatus along the moving metal strip, wherein laterally adjusting the dimensionally variable heat treatment apparatus includes using the longitudinal position to move the separation plane with respect to the moving metal strip as a function of the longitudinal position.

Example 19 is the product of examples 15 or 16, wherein the separation plane is parallel the moving metal strip, wherein heating the first portion of the moving metal strip includes heating one of a top and a bottom of the moving metal strip, and wherein cooling the moving metal strip includes removing heat from another of the top and the bottom of the moving metal strip.

Example 20 is the product of examples 15-18, wherein the separation plane is parallel a longitudinal axis of the moving metal strip and perpendicular a top surface of the moving metal strip, wherein the dimensionally variable heat treatment apparatus further includes an additional heating unit and an additional cooling unit each positioned on opposite sides of the separation plane and both positioned opposite the moving metal strip from the heating unit and the cooling unit, wherein heating the first portion of the moving metal strip includes heating the top surface and a bottom surface of the moving metal strip proximate the first portion, and wherein cooling the moving metal strip includes cooling the top surface and the bottom surface of the moving metal strip proximate the second portion.

What is claimed is:

1. A method for variably heat treating a metal article across a dimension of the metal article, the method comprising:

moving a metal article along a processing line through a dimensionally variable heat treatment apparatus having a heating unit and a cooling unit positioned on opposite sides of a separation plane, wherein the metal article is continuously moving along the processing line in a processing direction at a strip rate;

heating a first portion of the moving metal article by the heating unit, wherein heating the first portion includes raising a strip temperature of the first portion of the moving metal article at or above a heat treatment temperature for a duration;

cooling the moving metal article by the cooling unit, wherein cooling the moving metal article includes removing heat from the moving metal article adjacent the first portion sufficiently to maintain a temperature of a second portion of the moving metal article below the heat treatment temperature, wherein the second portion of the metal article is located opposite the separation plane from the first portion;

detecting a vertical and lateral position of the heating unit and the cooling unit as the metal article moves along the processing line;

adjusting a vertical and lateral position of the heating unit and the cooling unit along the processing line while the metal article is moving at the strip rate; and adjusting an intensity of the heating unit and the cooling unit based on the vertical and lateral position of the heating unit or the cooling unit along the processing line.

2. The method of claim 1, further comprising:

cooling the first portion of the moving metal article after heating the first portion of the moving metal article for the duration.

3. The method of claim 1, further comprising laterally adjusting the dimensionally variable heat treatment apparatus to move the separation plane with respect to the moving metal article.

4. The method of claim 3, further comprising determining a longitudinal position of the dimensionally variable heat treatment apparatus along the moving metal article, wherein laterally adjusting the dimensionally variable heat treatment apparatus includes moving the separation plane with respect to the moving metal article as a function of the longitudinal position of the dimensionally variable heat treatment apparatus.

5. The method of claim 1, further comprising vertically adjusting the dimensionally variable heat treatment apparatus to move the separation plane with respect to the moving metal article.

6. The method of claim 1, wherein the separation plane is parallel the moving metal article, wherein heating the first portion of the moving metal article includes heating one of a top and a bottom of the moving metal article, and wherein cooling the moving metal article includes removing heat from another of the top and the bottom of the moving metal article.

7. The method of claim 1, wherein the separation plane is parallel a longitudinal axis of the moving metal article and perpendicular a top surface of the moving metal article, wherein the dimensionally variable heat treatment apparatus further includes an additional heating unit and an additional cooling unit each positioned on opposite sides of the separation plane and both positioned opposite the moving metal article from the heating unit and the cooling unit, wherein heating the first portion of the moving metal article includes heating the top surface and a bottom surface of the moving metal article proximate the first portion, and wherein cooling the moving metal article includes cooling the top surface and the bottom surface of the moving metal article proximate the second portion.

8. The method of claim 1, further comprising heating the metal article in an initial heat treatment step.

9. The method of claim 1, further comprising heating the metal article in a final heat treatment step.

10. The method of claim 1, wherein the method comprises simultaneously heating the first portion of the moving metal article by the heating unit and cooling the second portion of the moving metal article.

* * * * *